United States Patent
Fukui et al.

(10) Patent No.: US 10,750,143 B2
(45) Date of Patent: Aug. 18, 2020

(54) OPTICAL SCANNING DEVICE

(71) Applicant: Funai Electric Co., Ltd., Daito, Osaka (JP)

(72) Inventors: Toshiaki Fukui, Osaka (JP); Hisayuki Negishi, Osaka (JP); Hideyuki Tanaka, Tokyo (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 71 days.

(21) Appl. No.: 15/472,711

(22) Filed: Mar. 29, 2017

(65) Prior Publication Data
US 2017/0289510 A1   Oct. 5, 2017

(30) Foreign Application Priority Data
Mar. 31, 2016 (JP) ................. 2016-072359

(51) Int. Cl.
*H04N 9/31* (2006.01)
*G02B 26/10* (2006.01)
*G02B 26/08* (2006.01)

(52) U.S. Cl.
CPC ....... *H04N 9/3194* (2013.01); *G02B 26/0841* (2013.01); *G02B 26/10* (2013.01); *G02B 26/101* (2013.01); *H04N 9/3155* (2013.01); *H04N 9/3185* (2013.01)

(58) Field of Classification Search
CPC .................................................. H04N 9/3194
See application file for complete search history.

(56) References Cited

U.S. PATENT DOCUMENTS 5,959,760 A * 9/1999 Yamada ............... G02B 7/1821
  359/223.1
6,467,345 B1* 10/2002 Neukermans .......... B82Y 15/00
  73/504.02
2005/0024704 A1* 2/2005 Sakai ................. G02B 26/0808
  359/212.1
2006/0222291 A1  10/2006 Yoshida
(Continued)

FOREIGN PATENT DOCUMENTS

JP    2005-31266 A    2/2005
JP    2006-284746 A   10/2006
(Continued)

OTHER PUBLICATIONS

Extended European Search Report of the corresponding European Application No. 17164103.8, dated Aug. 8, 2017.

*Primary Examiner* — Jefferey F Harold
*Assistant Examiner* — Justin B Sanders
(74) *Attorney, Agent, or Firm* — Global IP Counselors, LLP

(57) ABSTRACT

An optical scanning device includes a light source component, a scanning component, an electrostatic driver, a controller, and a current sensor. The light source component emits light. The scanning component scans the light. The driver drives the scanning component. The controller controls emission of the light from the light source component. The current sensor senses current generated by a capacity change of the driver. The controller further controls the emission of the light from the light source component based on the sensed current sensed by the current sensor.

19 Claims, 22 Drawing Sheets

(56) References Cited

U.S. PATENT DOCUMENTS

2010/0025783 A1* 2/2010 Katsumata ......... G01C 19/5719
  257/415
2016/0204716 A1* 7/2016 Suzuki ................. B81B 3/0054
  359/230
2016/0323562 A1* 11/2016 Nawasra ................ H04N 13/25

FOREIGN PATENT DOCUMENTS

| JP | 2007-225801 A | 9/2007 |
| JP | 2008-116678 A | 5/2008 |

* cited by examiner

OPTICAL SCANNING DEVICE

CROSS-REFERENCE TO RELATED APPLICATIONS

This application claims priority to Japanese Patent Application No. 2016-072359 filed on Mar. 31, 2016. The entire disclosure of Japanese Patent Application No. 2016-072359 is hereby incorporated herein by reference.

BACKGROUND

Field of the Invention

The present invention relates to an optical scanning device that scans a light beam over an irradiation region, and more precisely relates to an optical scanning device with which scanning stoppage or other such malfunctions can be detected.

Background Information

The display device disclosed in Japanese Laid-Open Patent Application Publication No. 2008-116678 (Patent Literature 1) is an example of a conventional optical scanning device (paragraphs 0025 and 0026, FIGS. 4 and 5, for example). The display device in Patent Literature 1 makes use of an electrostatic actuator, and comprises a sensor that senses the electrostatic capacity stored in a capacitor housed inside the electrostatic actuator. This sensor then produces a detection signal and passes it on to an amplitude sensor. The amplitude sensor analyzes the amplitude from the detection signal. The amplitude sensor then outputs a servo signal so that the amplitude will fit within a specific range. This servo signal is added to a drive signal supplied from an image signal supply component to produce a drive signal, which is transmitted to the electrostatic actuator. This control is performed to drive a reflecting surface (scanning mirror) over a specific angle range.

Japanese Laid-Open Patent Application Publication No. 2006-284746 (Patent Literature 2) discloses a MEMS device with a troubleshooting function, in which the troubleshooting of an electrostatic actuator is performed using an electrostatic capacity type of displacement sensor (paragraphs 0018 and 0020, FIG. 7, for example). This MEMS device having a troubleshooting function detects changes in the electrostatic capacity of an electrostatic actuator during minute damped vibration, which occurs when a mirror is moved over a path or is retracted from the path, that is, when it is moved binarily. The precursor to the malfunction is diagnosed based on frequency response characteristics of the phase and amplitude of the damped vibration, from the change in the electrostatic capacity.

SUMMARY

However, with the display device in Patent Literature 1, the drive signal is adjusted so that the electrostatic capacity will stay at a constant value, but if the scanning mirror should come to a stop due to contact with a foreign object, etc., this stopped state cannot be detected, and the drive signal ends up continuing to be supplied.

Also, with the MEMS device in Patent Literature 2, a malfunction is determined from a minute damped vibration, which occurs during binary movement, but it is difficult to detect a malfunction of the movable component (mirror) when the movable component is being continuously moved by the actuator.

In view of this, it is an object of the present invention to provide an optical scanning device with which accidents that happen when the irradiation location of a light beam is fixed can be suppressed by accurately detecting the stoppage of the movable component or another such malfunction state.

[1] In view of the state of the known technology and in accordance with a first aspect of the present invention, an optical scanning device comprises a light source component, a scanning component, an electrostatic driver, a controller, and a current sensor. The light source component emits light. The scanning component scans the light. The driver drives the scanning component. The controller controls emission of the light from the light source component. The current sensor senses current generated by a capacity change of the driver. The controller controls the emission of the light from the light source component based on the sensed current sensed by the current sensor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
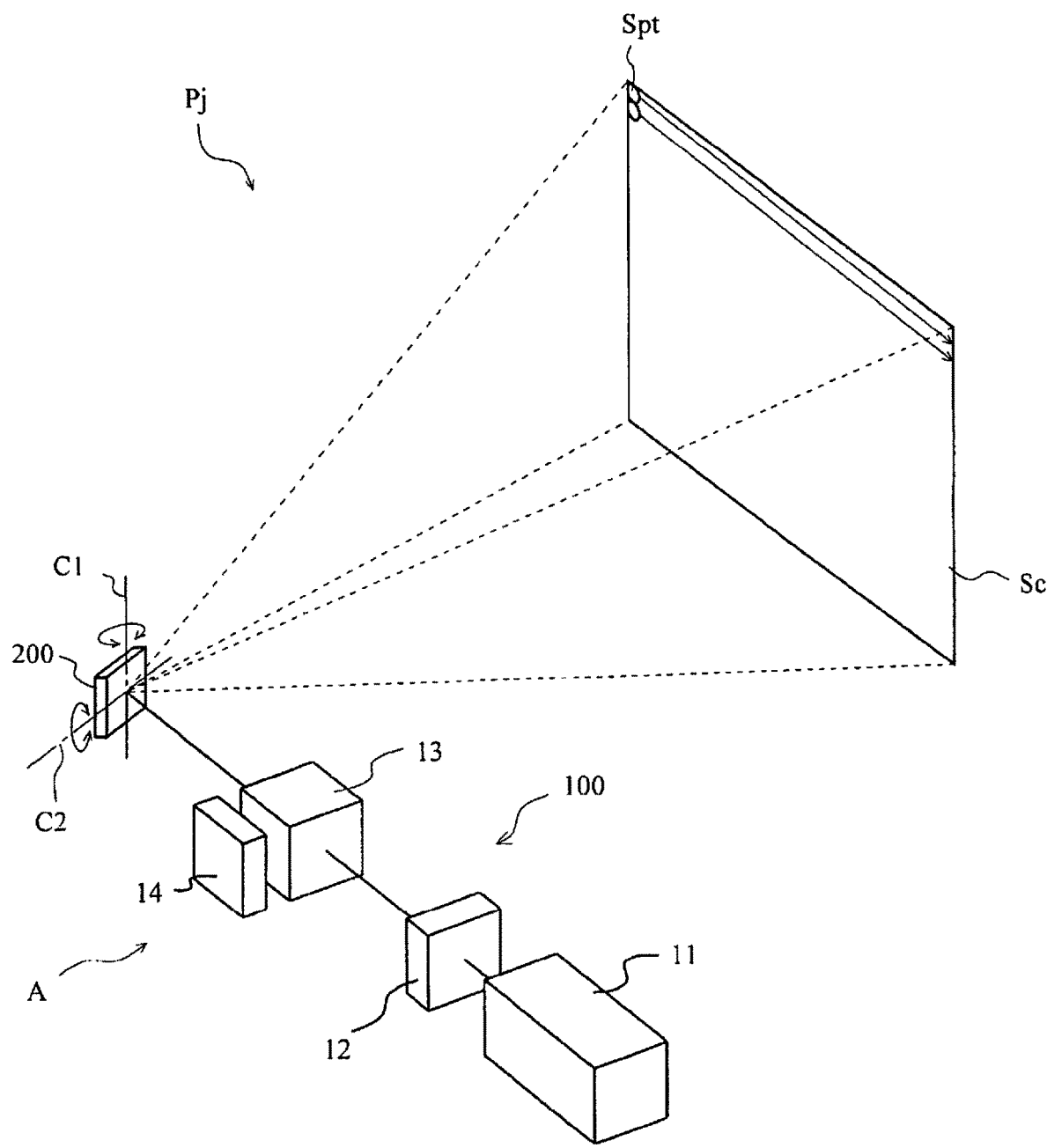
FIG. 1 is a simplified diagram of an image display device that makes use of the optical scanning device pertaining to the present invention.

FIG. 1 is a simplified diagram of an image display device that makes use of the optical scanning device pertaining to the present invention. The image display device Pj shown in FIG. 1 is known as a projector device, which scans a light beam (e.g., light) over a screen Sc (the projection surface) and displays video (a still or moving picture). As shown in FIG. 1, the optical scanning device A scans the screen Sc (raster scan) by moving the light beam in the lateral direction (termed the main scanning direction) of the screen Sc while moving the beam one line at a time in the vertical direction (termed the sub-scanning direction). The optical scanning device A comprises a light source component 100 and an optical scanner 200.

The light source component 100 includes a light source 11, a lens 12, a beam splitter 13, and a monitor-use light receiver receiving element 14 (monitor-use light receiving element). The light source 11 can emit light of a predetermined wavelength, and is a semiconductor light emitting element, for example. One that makes use of electrical discharge, etc., may also be used. A wide range of light sources that allow light to be emitted stably can be employed. A laser light emitting diode (LD: laser diode) that emits a laser beam is employed in this embodiment. If the image display device Pj is a device that displays color video, the light source 11 is configured to be able to emit light that is a mixture of red (R) light, green (G) light, and blue (B) light.

The light source 11 is a point light source, and the emitted light is scattered light. Accordingly, the light source component 100 transmits the light emitted from the light source 11 to the lens 12, where it is converted into parallel light or substantially parallel light and made into a light beam. The lens 12 here is a collimator lens, but this is not the only option, and a wide range of light emitting elements that convert scattered light into parallel light can be employed.

The light beam emitted from the lens 12 is incident on the beam splitter 13. The beam splitter 13 is one that is optimized for the light beam, reflecting part of the incident light beam and transmitting the rest. The light beam reflected by the beam splitter 13 is incident on the monitor-use light receiver 14. The monitor-use light receiver 14 outputs a monitor signal indicating the intensity of the light beam, based on the incident light beam. The monitor signal is passed on to a light source controller 311 of a controller 31 (discussed below).

Figure 2:
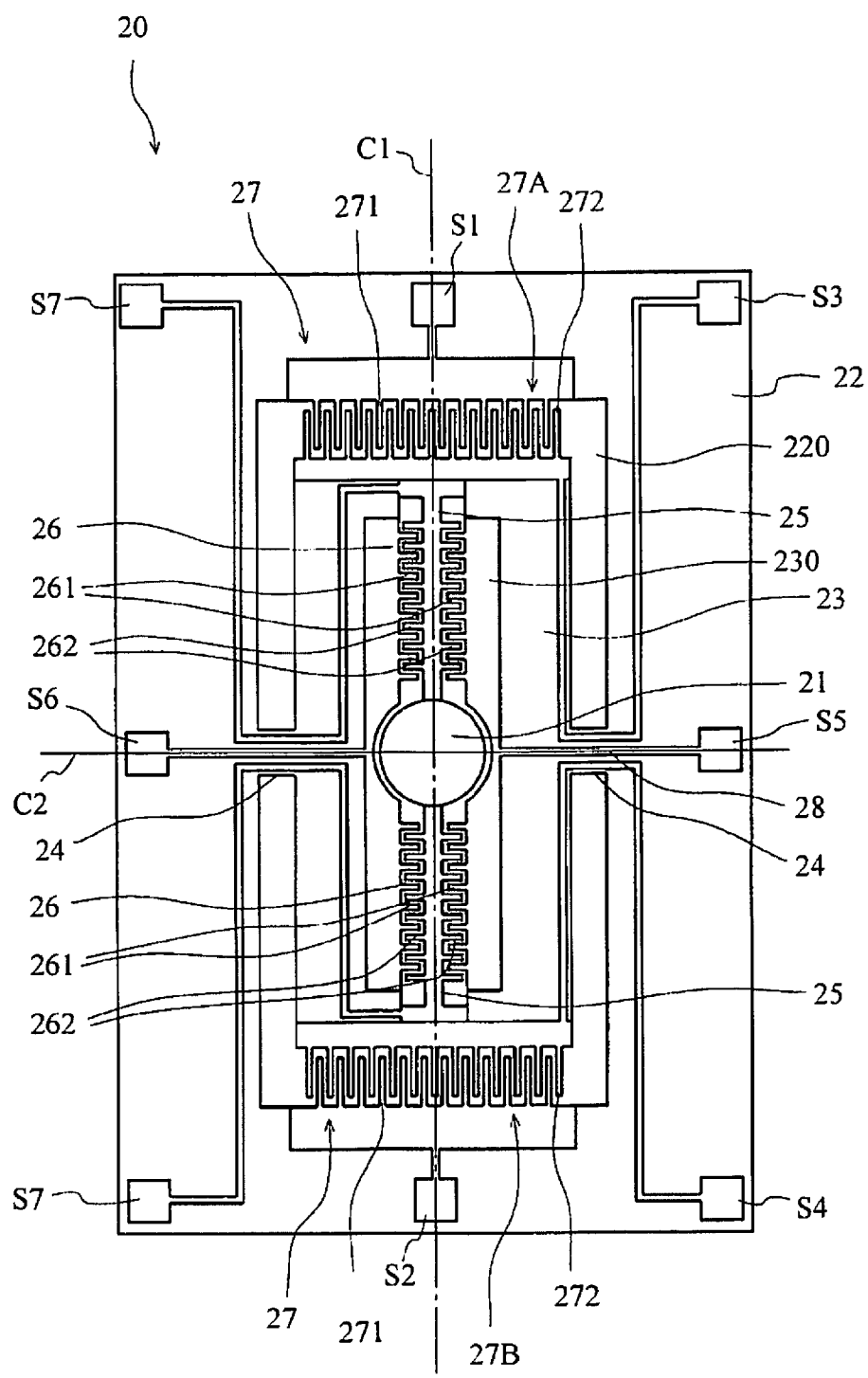
FIG. 2 is a plan view of the optical scanning element pertaining to the present invention.

The light beam that is transmitted by the beam splitter 13 is incident on the optical scanner 200. The optical scanner 200 comprises an optical scanning element 20 that scans while reflecting the light beam. The optical scanning element will be described in detail through reference to the drawings. FIG. 2 is a plan view of the optical scanning element pertaining to the present invention. The optical scanning element 20 shown in FIG. 2 comprises a mirror 21 (e.g., scanning component), a fixed frame 22, a movable frame 23 (e.g., scanning component), first elastic supports 24, second elastic supports 25, main drivers 26 (e.g., scanning component), and sub-drivers 27 (e.g., electrostatic driver). In describing the shape of the optical scanning element 20, a state in which the optical scanning element 20 is stopped, that is, the state shown in FIG. 2, will serve as a reference.

The optical scanning element 20 reflects the light beam with the mirror 21, while reciprocally rotating (pivoting) at a specific angle around an axis C1 and an axis C2 that are at right angles to the mirror 21. Rotating the mirror 21 around the axis C1 allows the light beam to be scanned in the main scanning direction, and in the following description, the axis C1 shall be described as the main scanning axis C1. Similarly, the axis C2 is perpendicular to the axis C1, and rotating the mirror 21 around the axis C2 allows the light beam to be scanned in the sub-scanning direction, so in the following description, the axis C2 shall be described as the sub-scanning axis C2.

As shown in FIG. 2, the fixed frame 22 is a rectangular, plate-shaped member whose long side runs along the main axis C1, and comprises a window 220 that passes through in a rectangular shape in the middle. The window 220 is provided so that its center overlaps the point where the main scanning axis C1 and the sub-scanning axis C2 intersect. The movable frame 23 is disposed inside of the window 220. The movable frame 23 is provided so that its center overlaps the center of the window 220.

The middle part of the end of the movable frame 23 in the short-side direction (the sub-scanning axis C2 direction) and the middle part of the portion opposite the window 220 are linked by the first elastic supports 24, which extend in the sub-scanning axis C2 direction. The first elastic supports 24 are provided so as to pair up with the center parts of the two long sides of the movable frame 23. That is, the center portions of the long sides of the movable frame 23 are linked to the fixed frame 22 via the first elastic supports 24. The first elastic supports 24 are rod-shaped members, and twist elastically around the sub-scanning axis C2. Specifically, the movable frame 23 is supported rotatably (pivotably) around the sub-scanning axis C2 with respect to the fixed frame 22.

Also, the ends of the movable frame 23 in the direction running along the main scanning axis C1 are opposite the portions that form the short sides of the window 220. The sub-driver 27, which exerts a rotational force around the sub-scanning axis C2 to the movable frame 23, is provided at the opposing portions of the movable frame 23 and the window 220 in the main scanning axis C1 direction. The sub-driver 27 is provided as a pair that flanks the sub-scanning axis C2. Thus, in the illustrated embodiment, the sub-driver drives the movable frame 23 and the mirror 21 on the movable frame 23.

The sub-drivers 27 each comprise a plurality of stationary-side electrodes 271 that protrude inward and parallel to the main scanning axis C1 from the inner peripheral part of the window 220 of the fixed frame 22, and a plurality of movable-side electrodes 272 that protrude outward from the ends of the movable frame 23 in the main scanning axis C1 direction. In the following description, when needed, one of the pair of sub-drivers 27 will be called the first sub-driver 27A, and the other the second sub-driver 27B.

The stationary-side electrodes 271 and the movable-side electrodes 272 are free at their distal ends, and they are equidistantly spaced apart in the sub-scanning axis C2 direction. The stationary-side electrodes 271 and the movable-side electrodes 272 are disposed so that they alternate in the sub-scanning axis C2 direction. The sub-drivers 27 are dissonant electrostatic actuators, and an attractive force is generated between the stationary-side electrodes 271 and the movable-side electrodes 272 by the voltage (potential difference) between the stationary-side electrodes 271 and the movable-side electrodes 272. The attractive force is generated alternately between the pair of sub-drivers 27, which exerts a drive force to pivot the movable frame 23 around the sub-scanning axis C2.

The movable frame 23 is a rectangular, plate-shaped member, and comprises a slit 230 passing through in the middle. The slit 230 is provided in the middle in the short-side direction (here, the sub-scanning axis C2 direction), and extends in the lengthwise direction (here, the main scanning axis C1 direction). The mirror 21 is disposed inside the slit 230. The mirror 21 is in the form of a circular disk, and the inner peripheral face of the middle portion of the slit 230 is formed in an arc shape to match the shape of the mirror 21. The movable frame 23 and the mirror 21 are disposed so that their centers coincide. The mirror 21 is linked to the movable frame 23 via the second elastic supports 25, which extend in the main scanning axis C1 direction, from both ends in the main scanning axis C1 direction.

The second elastic supports 25 are rod-shaped members, and twist elastically around the main scanning axis C1. Because of this, the mirror 21 is supported so that it can rotate (pivot) around the main scanning axis C1 with respect to the movable frame 23. The surface of the mirror 21 has a mirror face so that it can reflect the light beam emitted from the light source component 100. The mirror face of the mirror 21 may, for example, be formed by a metal thin-film with high reflectivity, or, if the reflectivity of the mirror 21 is high, it may be given a mirror finish to reduce the size of the bumps and pits on the surface.

The main drivers 26, which exert drive force on the second elastic supports 25, are provided between the second elastic supports 25 and the movable frame 23. The main drivers 26 each comprise a plurality of stationary-side electrodes 261 that protrude inward from the inner peripheral faces in the sub-scanning axis C2 direction of the slit 230 of the movable frame 23, and a plurality of movable-side electrodes 262 that protrude from both sides of the second elastic supports 25 in the sub-scanning axis C2 direction.

The stationary-side electrodes 261 are equidistantly spaced apart in a direction running along the main scanning axis C1. The movable-side electrodes 262 are also equidistantly spaced apart in a direction running along the main scanning axis C1. The stationary-side electrodes 261 and the movable-side electrodes 262 that are disposed opposite each other are disposed alternately so as to be adjacent in the main scanning axis C1 direction.

As shown in FIG. 2, two of the main drivers 26 are provided as a symmetrical pair, flanking the sub-scanning axis C2. The main drivers 26 are provided such that the stationary-side electrodes 261 and the movable-side electrodes 262 are in line symmetry, with the main scanning axis C1 as their axis.

The main drivers 26 generate an attractive force between the stationary-side electrodes 261 and the movable-side electrodes 262 by applying voltage between the stationary-side electrodes 261 and the movable-side electrodes 262, and this attractive force twists the second elastic supports 25. Consequently, the mirror 21 supported by the second elastic supports 25 rotates around the main scanning axis C1.

The force generated between the stationary-side electrodes 261 and the movable-side electrodes 262 of the main drivers 26 is weak, and the rotational angle of the mirror 21 is small. Specifically, it is difficult to rotate the mirror 21 by a sufficient angle by applying DC voltage. In view of this, voltage with a pulse waveform or a sine waveform is applied so as to generate resonant vibration based on the resonance frequency, which is determined by the shape, weight, and so forth of the mirror 21, the second elastic supports 25, and the main drivers 26. The mirror 21 is thus largely pivoted by generating the oscillation phenomenon by applying the voltage according to the resonance frequency. Since the mirror 21 is thus rotated by using resonant vibration, the main drivers 26 are resonant electrostatic actuators.

The optical scanning element 20 is such that the fixed frame 22, the first elastic supports 24, the movable frame 23, the second elastic supports 25, and the mirror 21 are molded integrally. The optical scanning element 20 itself is what is known as a MEMS device, which is a tiny, lightweight element made with micro-working technology. A wiring pattern 28 is formed on the surface of the optical scanning element 20, and terminals S1 to S8 are provided to the four corners of the fixed frame 22 and to the middle portion of each side. The wiring pattern 28 and the terminals S1 to S8 are, for example, printed wiring formed from a metal thin-film with high conductivity, such as copper or aluminum, but this is not the only option. The terminals S1 to S8 are connected to a driver 29, and signals (drive signals) for driving the main drivers 26 and the sub-drivers 27 are supplied via the terminals S1 to S8.

As shown in FIG. 2, the terminals S1 and S2 are provided to the center portions of the two short sides of the fixed frame 22. The terminals S1 and S2 are connected via the wiring pattern 28 to the stationary-side electrodes 271 of the sub-drivers 27. The terminals S3 and S4 are provided to the corners on the right side of the fixed frame 22. The terminals S3 and S4 are connected via the wiring pattern 28 to the movable-side electrodes 272 of the sub-drivers 27 (the first sub-driver 27A and the second sub-driver 27B). The terminals S5 and S6 are provided to the center portions of the two long sides of the fixed frame 22. The terminals S5 and S6 are connected via the wiring pattern 28 to the stationary-side electrodes 261 of the main drivers 26. The terminals S7 and S8 are provided to the corners on the left side of the fixed frame 22. The terminals S7 and S8 are connected via the wiring pattern 28 to the movable-side electrodes 262 of the main drivers 26.

The optical scanning element 20 is configured as above. With the optical scanner 200, the fixed frame 22 is fixed to an immobile member, and the sub-drivers 27 rotate (pivot) the movable frame 23 around the sub-scanning axis C2 with respect to the movable frame 23. Also, the main drivers 26 rotate (pivot) the mirror 21 around the main scanning axis C1 with respect to the movable frame 23. When scanning is performed in this way, the optical scanning element 20 pivots the mirror 21 around the main scanning axis C1 and the sub-scanning axis C2.

Figure 3:
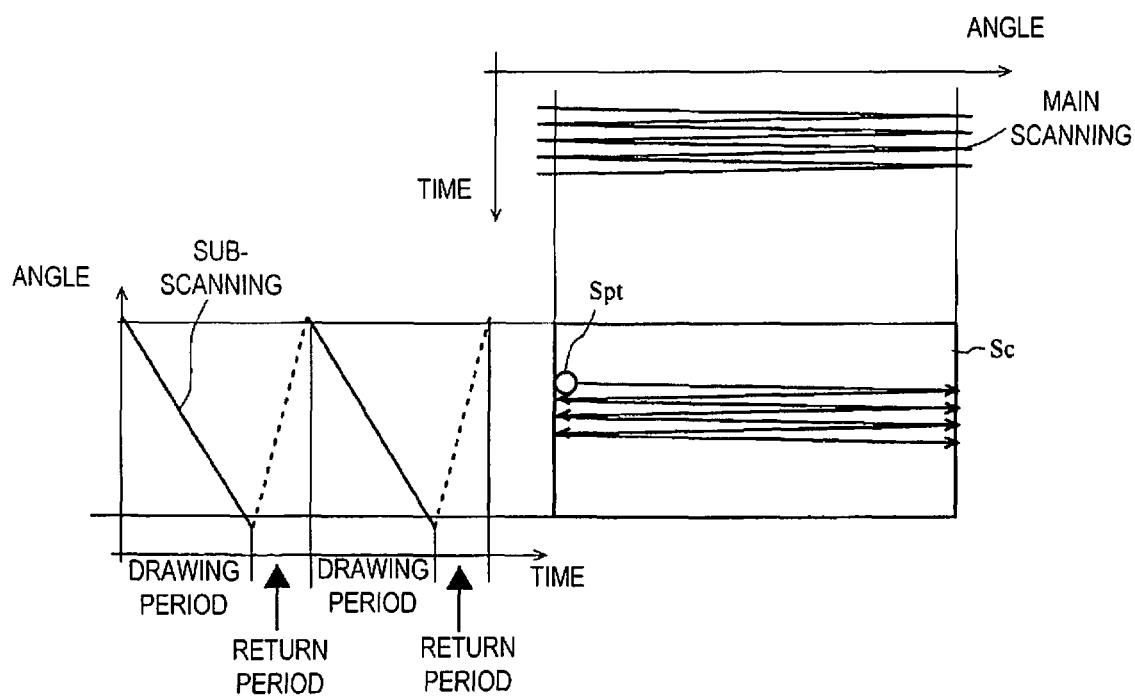
FIG. 3 is a simplified view of main scanning and sub-scanning.

An example of using the optical scanning device A to display video on a screen will be described. FIG. 3 is a simplified view of main scanning and sub-scanning. The optical scanner 200 displays video on the screen Sc by reflecting the light beam with the mirror 21 at the proper timing in a state in which the optical scanning element 20 has been driven as above.

The optical scanning element 20 performs drawing (scanning) one stage at a time, from the top to the bottom (or vice versa), and returns to the top stage when the bottom stage has been reached. Specifically, two-dimensional scanning (raster scan) is performed in which the screen is filled in with scan lines in the main scanning direction. With the optical scanning element 20, movement of the light spot in the lateral direction is performed by main scanning with the main drivers 26, and movement of the scan line in the up and down direction is performed by sub-scanning with the sub-drivers 27. When video is displayed on a screen or the like, a plurality of pages of video are displayed per second, and the period required to draw video one time is one frame.

In the optical scanning element 20, the sub-drivers 27 move the light beam (the movable frame 23 or the mirror 21) back and forth one time in one frame. Meanwhile, the main drivers 26 move the light beam (the mirror 21) back and forth a number of times proportional to the number of scan lines displayed on the screen in one frame. Therefore, with the optical scanning element 20, sub-scanning is performed more slowly than main scanning. Examples of the frequency of pivoting around the main scanning axis and the frequency of pivoting around the sub-scanning axis of the optical scanning element 20 include a frequency of 24 kHz in the main scanning direction and a frequency of 30 Hz in the sub-scanning direction.

When video is shown on the screen Sc, a single frame includes a drawing period during which video is drawn, and a return period for returning the light spot from the end point to the origin. The drawing period is a period in which video is drawn, and the return period is a period in which video is not drawn. The return period is preferably kept short in order to maintain continuity of the video. To that end, with the optical scanning device A, as shown in FIG. 3, there is a short return period and a long drawing period in one frame. In the optical scanning element 20, the sub-drivers 27 rotate the movable frame 23 (the mirror 21) from the upper limit to the lower limit during the drawing period, and rotate it from the lower limit to the upper limit during return period. Therefore, the rotation speed (angular velocity) of the movable frame 23 is lower during the drawing period and higher during the return period. Thus, in the illustrated embodiment, the movable frame 23 or mirror 21 (e.g., scanning component) scans the light beam in the screen Sc (e.g., scanned region) during the drawing period, and returns the light beam from the scanning end position to the scanning start position during the return period.

Figure 4:
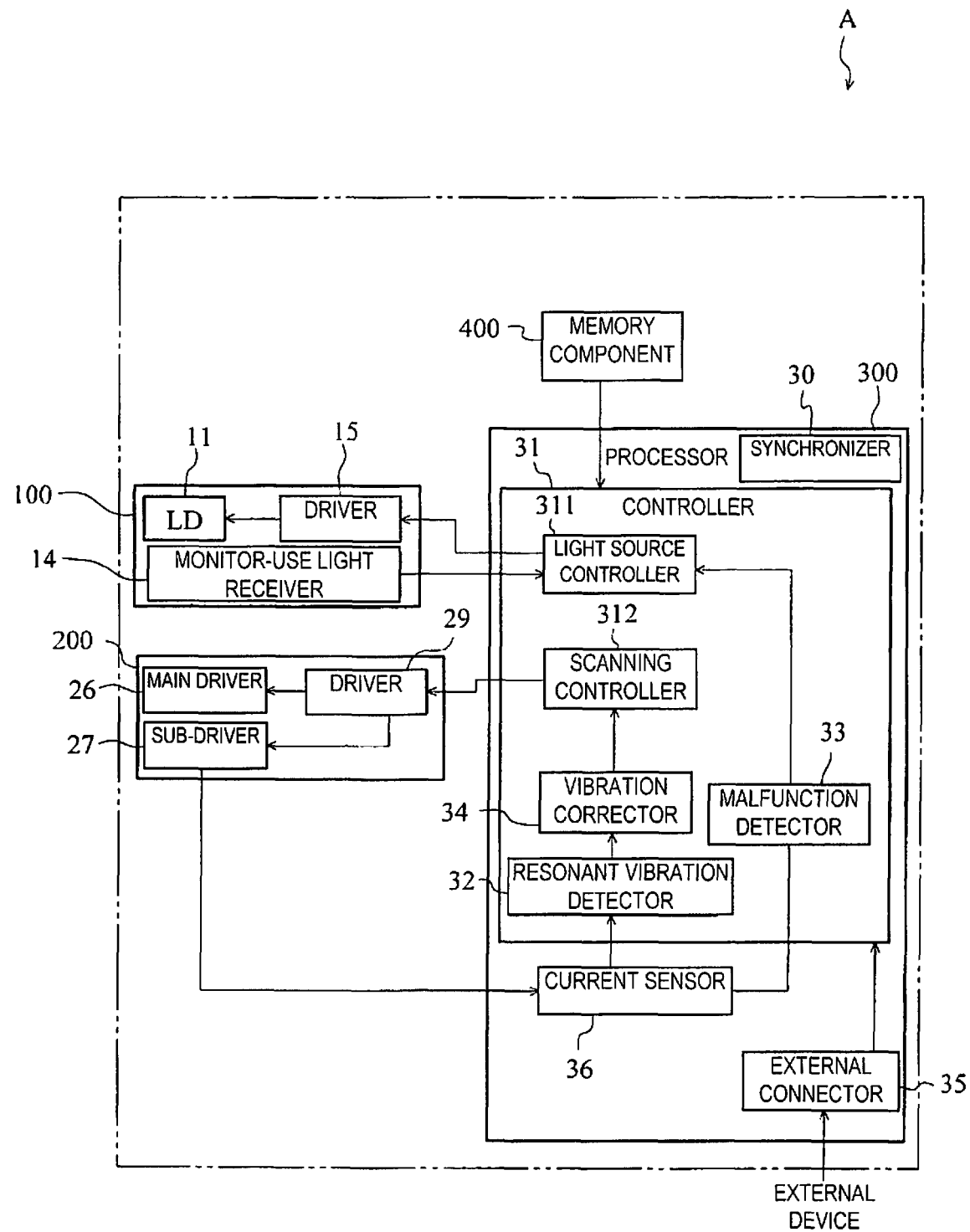
FIG. 4 is a block diagram of the optical scanning device pertaining to the present invention.

Next, the electrical connections of the optical scanning device A comprising the light source component 100 and the optical scanner 200 will be described. FIG. 4 is a block diagram of the optical scanning device pertaining to the present invention.

The optical scanning device A comprises a processor 300 and a memory component 400 in addition to the above-mentioned light source component 100 and optical scanner 200. As shown in FIG. 4, in addition to the above configuration, the light source component 100 comprises a driver 15 that gives a drive signal to the light source 11. Also, the optical scanner 200 is provided with the driver 29 that gives a drive signal to the main drivers 26 and the sub-drivers 27.

The processor 300 includes a CPU, an MPU, or other such computation processing circuitry, and as shown in FIG. 4, comprises a synchronizer 30, the controller 31, a resonant vibration detector 32, a malfunction detector 33, a vibration corrector 34, an external connector 35, and a current sensor 36. Thus, in the illustrated embodiment, the controller 31 is realized by a processor or processing circuit.

The processor 300 performs various kinds of processing in the optical scanning device A. This various processing includes processing to produce emission control information and optical scanning control information for driving the light source component 100 and the optical scanner 200. Accordingly, the processor 300 is connected via the external connector 35 to a PC, a DVD, a BD, or another such external device. The external connector 35 is not limited to this, however. For example, it may be configured so that an antenna is connected and receives broadcast waves, and video data can be extracted from the broadcast waves. The various components of the processor 300 operate based on synchronization signals from the synchronizer (synchronization component) 30. The synchronizer 30 comprises an oscillation circuit that outputs signals for synchronizing the operation of the various components, and output a frame synchronization signal that determines the drawing period and the return period. A synchronization signal other than a frame synchronization signal may also be outputted.

The memory component 400 comprises an invokable ROM, a readable and writable RAM, or the like. The memory component 400 holds data, tables, parameters, and other such information that is needed for the processing done by the optical scanning device A. It also stores data processed by the processor 300. The processor 300 is designed to be able to access the memory component 400 at any time.

The controller 31 performs scanning control of the light beam scanning speed, scanning angle (scanning range), and so forth in the optical scanner 200, and controls the emission of the light beam from the light source component 100. In particular, in the illustrated embodiment, the controller 31 controls the emission of the light beam from the light source component 100 based on current sensed by the current sensor 36. The scanning light source controller 31 comprises the light source controller 311, a scanning controller 312, the resonant vibration detector 32, the malfunction detector 33, and the vibration corrector 34. The light source controller 311, the scanning controller 312, the resonant vibration detector 32, the malfunction detector 33, and the vibration corrector 34 may be programs that are operated by the controller 31, or may be configured as independent circuits within the controller 31.

The light source controller 311 controls the drive of the light source component 100. The light source controller 311 receives a monitor signal from the monitor-use light receiver 14. The light source controller 311 produces emission control information for determining the emission of a light beam based on video information. Also, the light source controller 311 corrects the emission control information based on the monitor signal as needed. The light source controller 311 sends emission control information to the driver 15. The driver 15 sends the light source 11 a drive signal (such as a drive voltage) produced based on the emission control information. The light source 11 emits light based on this drive signal.

The scanning controller 312 controls the drive of the optical scanning element 20. The scanning controller 312 produces optical scanning information including the scanning angle, scanning frequency, and so forth of the light beam produced by the optical scanning element 20, based on video information. Also, the scanning controller 312 accepts correction parameters (discussed below) from the vibration corrector 34, and corrects the optical scanning information as needed based on these correction parameters. The optical scanning information is then sent to the driver 29. The driver 29 produces a drive signal based on the optical scanning information, and sends this signal to the main drivers 26 and the sub-drivers 27. The main drivers 26 and the sub-drivers 27 pivot the mirror 21 and the movable frame 23, respectively, based on drive signals.

The current sensor 36 senses the current generated between the stationary-side electrodes and movable-side electrodes of the main drivers 26 and/or the sub-drivers 27. With the optical scanning device A pertaining to the present invention, current produced by a change (e.g., capacity change) in the capacity of the sub-drivers 27 is sensed. The current sensor 36 sends information about the sensed current as current information to the resonant vibration detector 32 and the malfunction detector 33. The current sensor 36 will be discussed in more detail below.

As discussed above, pivoting of the mirror 21 (the movable frame 23) in the sub-scanning direction in the optical scanning element 20 is performed by dissonance. However, there are times when resonant vibration based on the resonance frequency is generated when the movable frame 23 pivots, and if resonant vibration occurs, lightness or darkness will occur in the sub-scanning direction in the video projected on the screen Sc. Accordingly, the resonant vibration detector 32 detects resonant vibration included in the pivoting of the mirror 21 of the optical scanning element 20 around the sub-scanning axis C2 based on current information from the current sensor 36. When resonant vibration is detected, the resonant vibration detector 32 sends information (amplitude and phase) about the resonant vibration to the vibration corrector 34.

The vibration corrector 34 produces a correction parameter for correcting the optical scanning information so as to control the resonant vibration based on information about the resonant vibration, and sends this correction parameter to the scanning controller 312. The vibration corrector 34 produces and sends a correction parameter whenever correction is necessary.

The current sensor 36 also passes on the sensed current information to the malfunction detector 33. The malfunction detector 33 detects the stoppage of the movable frame 23 of the optical scanning element 20 or other such malfunctions based on the current information. In the following description, stoppage will be described as an example of a malfunction in the movable frame 23. Malfunctions other than stoppage will also be described as appropriate. The stoppage of the movable frame 23 occurs when there is a disconnection in part of the wiring, a short circuit, or some other circuit malfunction, or when a foreign object hits the movable frame 23. It is also conceivable that stoppage will occur for some other reason. Regardless of the reason, the malfunction detector 33 detects stoppage of the movable frame 23 and other such malfunctions. The malfunction detector 33 sends malfunction occurrence information to the light source controller 311 upon detecting a malfunction in the operation of the movable frame 23 from the current information. The malfunction detector 33 can also detect a malfunction in the movable frame 23 other than stoppage, such as a decrease in the rotational speed, or a reduction in the rotational angle, and can send this as malfunction occurrence information to the light source controller 311. It can also send the light source controller 311 information classified into malfunction occurrence information and stoppage information.

Upon acquiring malfunction occurrence information, the light source controller 311 sends the driver 15 emission control information to limit the emission of light from the light source 11, as light output control information. The driver 15 sends the light source 11 a drive signal that limits the emission of light from the light source 11 upon acquiring emission control information.

Figure 5:
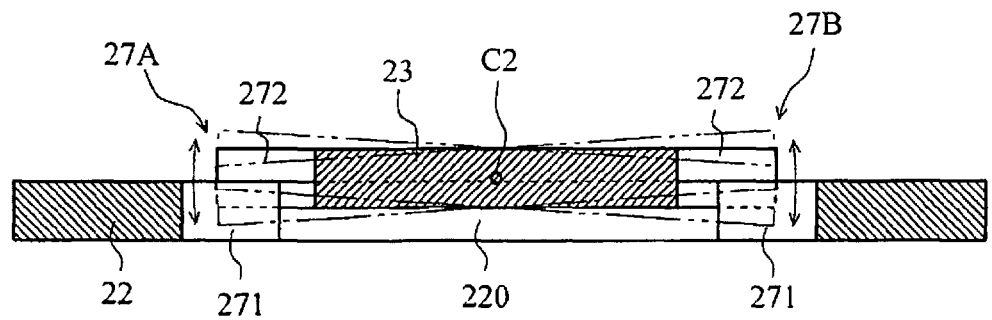
FIG. 5 is a cross section of the basic structure of a fixed frame and a movable frame including the sub-driver shown in FIG. 2.
Figure 6:
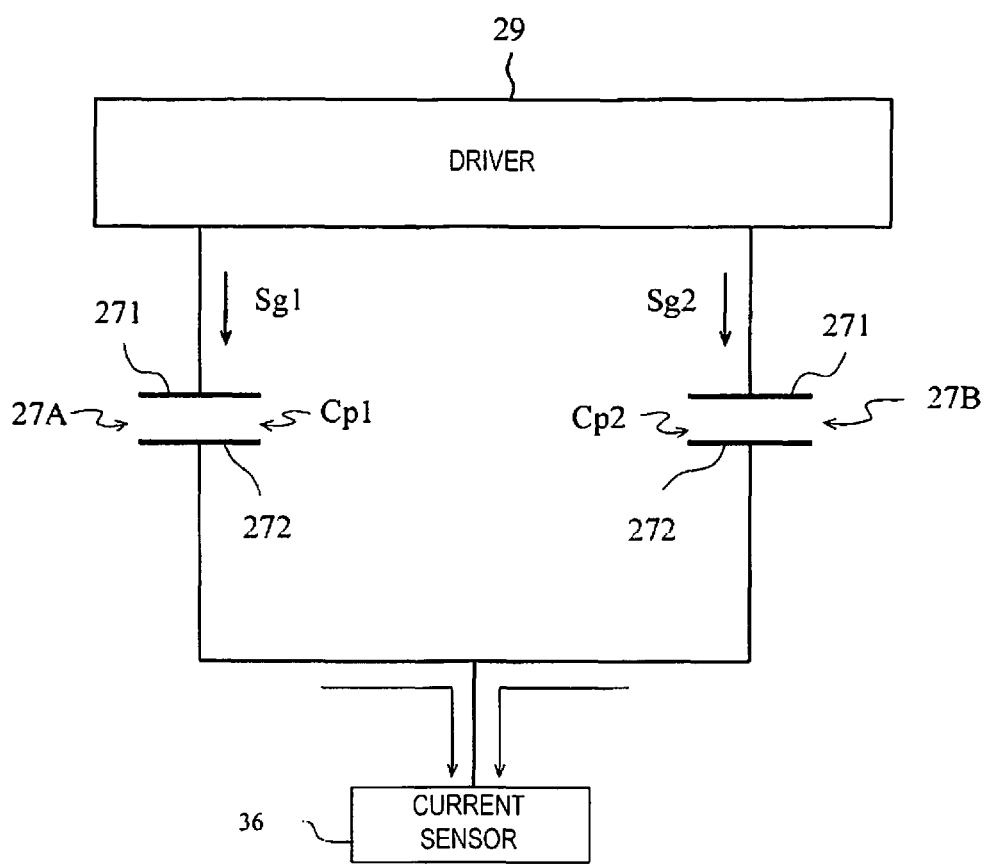
FIG. 6 is an electrical equivalent circuit diagram of the sub-driver attached to the fixed frame and movable frame.

The detection of stoppage or other such malfunction in the movable frame 23 will now be described through reference to another drawing. First, the operation of the movable frame 23 by means of a drive signal will be described. FIG. 5 is a cross section of the basic structure of a fixed frame and a movable frame including the sub-driver shown in FIG. 2. FIG. 6 is an electrical equivalent circuit diagram of the sub-driver attached to the fixed frame and movable frame.

In FIG. 5, the fixed frame 22, the movable frame 23, and the sub-drivers 27 are shown in cross section, cut along a plane perpendicular to the sub-scanning axis C2. The mirror 21, the second elastic supports 25, and the main drivers 26 that are provided on the inside of the movable frame 23 are not shown in FIG. 5. Also, in the following description, the pair of sub-drivers 27 provided to the ends of the movable frame 23 in the lengthwise direction will sometimes be distinguished as the first sub-driver 27A and the second sub-driver 27B as necessary.

As shown in FIG. 5, the fixed frame 22 and the movable frame 23 are offset in the thickness direction. As shown in FIG. 6, the first sub-driver 27A and the second sub-driver 27B have stationary-side electrodes 271 and movable-side electrodes 272 that constitute capacitors Cp1 and Cp2, respectively. The stationary-side electrodes 271 are each connected to the driver 29. The driver 29 gives a first drive signal Sg1 to the stationary-side electrode 271 of the first sub-driver 27A, and gives a second drive signal Sg2 to the stationary-side electrode 271 of the second sub-driver 27B.

The first drive signal Sg1 and second drive signal Sg2 are voltage signals. For example, when the first drive signal Sg1 is given to the stationary-side electrode 271 of the first sub-driver 27A, a potential difference is produced between the stationary-side electrode 271 and the movable-side electrode 272, and an attractive force is produced between the stationary-side electrode 271 and the movable-side electrode 272. Since the stationary-side electrodes 271 are provided to the fixed frame 22, and the movable-side electrodes 272 are provided to the movable frame 23, the movable-side electrode 272 are pulled to the stationary-side electrode 271 by attraction, and the movable frame 23 rotates around the sub-scanning axis C2.

A drive signal is then supplied so that the above-mentioned attractive force is alternately exerted on the first sub-driver 27A and the second sub-driver 27B, causing the movable frame 23 to rotate (pivot) around the sub-scanning axis C2. When the movable frame 23 pivots around the sub-scanning axis C2, the surface areas over which the stationary-side electrodes 271 and the movable-side electrodes 272 of the first sub-driver 27A and the second sub-driver 27B overlap in the sub-scanning axis C2 direction fluctuates. If the surface area over which the stationary-side electrode 271 and the movable-side electrode 272 of the first sub-driver 27A overlap in the sub-scanning axis C2 direction increases (or decreases), the surface area over which the stationary-side electrode 271 and the movable-side electrode 272 of the second sub-driver 27B overlap in the sub-scanning axis C2 direction decreases (or increases).

As discussed above, the first sub-driver 27A and the second sub-driver 27B form the capacitors Cp1 and Cp2 with the stationary-side electrodes 271 and movable-side electrode 272, respectively. Usually, the electrostatic capacity of a capacitor changes when there is a change in the surface area of the opposing electrodes. The surface area over which the stationary-side electrode 271 and the movable-side electrode 272 are opposite (overlap) in the sub-scanning axis C2 direction in the first sub-driver 27A and the second sub-driver 27B fluctuates with the rotation of the movable frame 23. That is, the capacitors Cp1 and Cp2 have a variable electrostatic capacity.

With the surface areas over which the stationary-side electrodes 271 and the movable-side electrodes 272 of the first sub-driver 27A and the second sub-driver 27B overlap in the sub-scanning axis C2 direction, one of them becomes larger as the other one becomes smaller, or becomes smaller as the other one becomes larger, depending on the rotation (pivoting) of the movable frame 23. That is, with the capacities of the capacitors Cp1 and Cp2, one of them becomes higher as the other one becomes lower, or becomes lower as the other one becomes higher, depending on the rotation (pivoting) of the movable frame 23.

When the movable-side electrodes 272 of the capacitors Cp1 and Cp2 whose electrostatic capacity thus varies are electrically connected together, the current shown in FIG. 6 is generated between the movable-side electrodes 272. This current flows based on the operation of the movable frame 23, that is, it is current that is correlated to this operation. With the optical scanning device A pertaining to the present invention, the current generated between the movable-side electrodes 272 is sensed by the current sensor 36. The rotational state of the movable frame 23 can be sensed by confirming the characteristics of the sensed current (its waveform, representative value, amplitude, phase, etc.).

The optical scanning element 20 is configured as shown in FIG. 2. Therefore, to configure the equivalent circuit shown in FIG. 6, the output terminal of the driver 29 is connected to terminals S1 and S2, and a terminal S3 and a terminal S4 are connected to connect to the current sensor 36.

Figure 7:
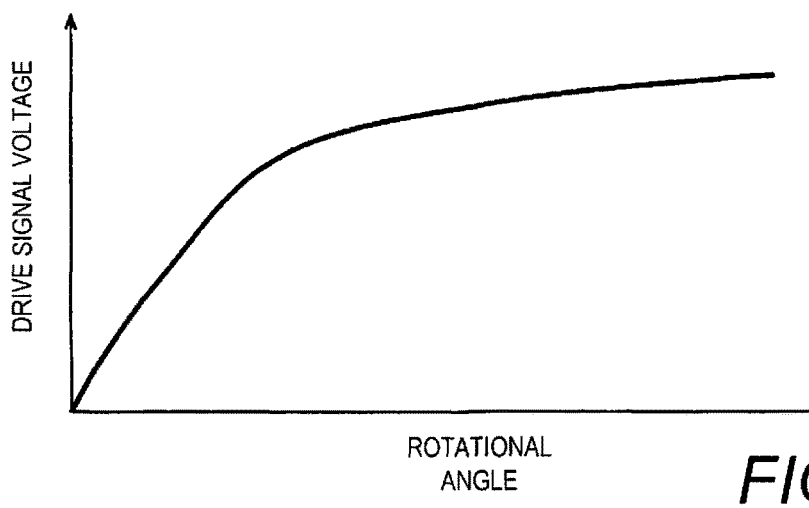
FIG. 7 is a graph of the relation between the rotational angle and the drive signal voltage of a drive mechanism configured as shown in FIG. 5.

The drive signal will now be described. FIG. 7 is a graph of the relation between the rotational angle and the drive signal voltage of a drive mechanism configured as shown in FIG. 5. The movable frame 23 rotates when voltage (a drive signal) is applied to the stationary-side electrodes 271 of the sub-drivers 27. In FIG. 7, the horizontal axis is the rotational angle, and the vertical axis is the drive signal voltage (that is, the voltage applied to the stationary-side electrodes 271). As shown in FIG. 7, the voltage applied to the stationary-side electrodes 271 and the rotational angle of the movable frame 23 are not linear characteristics. FIG. 7 is just an example, and actually there will be variance from one component to the next. Therefore, with an actual optical scanning element 20, the drive signal voltage and the rotational angle are measured at the time of manufacture, and this data is stored in table form in the memory component 400.

Figure 8:
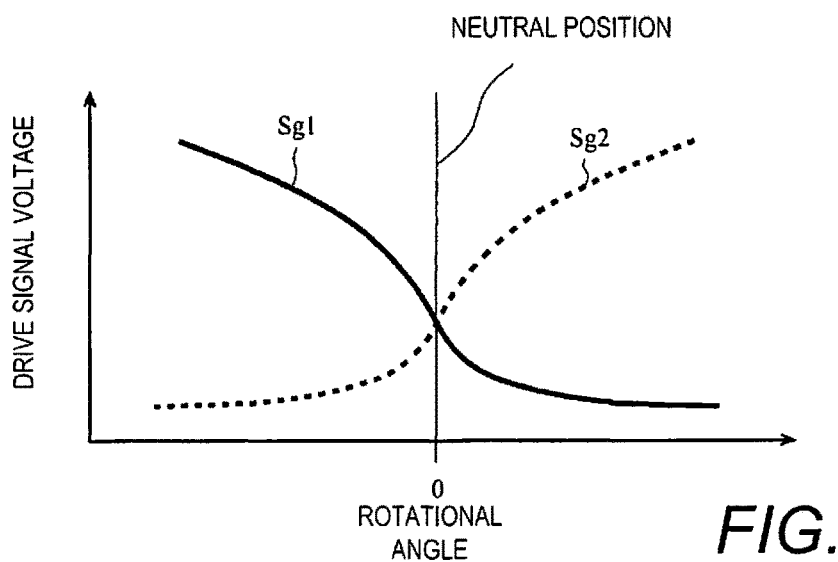
FIG. 8 is a graph of the relation between the rotational angle of the movable frame and the drive signal voltage supplied to the sub-driver that drives the movable frame configured as shown in FIG. 5.

It is preferable if main scanning and sub-scanning are performed in synchronization at the optical scanner 200, and the movable frame 23 (sub-scanning) is rotated at a constant angular velocity. The drive signal is set by taking into account the drive signal voltage and rotational angle shown in FIG. 7. The drive signal will now be described. FIG. 8 is a graph of the relation between the rotational angle of the movable frame and the drive signal voltage supplied to the sub-driver that drives the movable frame configured as shown in FIG. 5.

In FIG. 8, the vertical axis is the drive signal voltage, and the horizontal axis is the rotational angle of the movable frame 23. Also, in FIG. 8, the center of the horizontal axis is a state in which the rotational angle is 0°, that is, in which the movable frame 23 and the fixed frame 22 are parallel (hereinafter also referred to as the neutral position). To the left of center on the horizontal axis is when the surface area over which the stationary-side electrode 271 and the movable-side electrode 272 of the first sub-driver 27A overlap in the sub-scanning axis C2 direction tends to increase. The right side shows the angle when the surface area over which the stationary-side electrode 271 and the movable-side electrode 272 of the second sub-driver 27B overlap in the sub-scanning axis C2 direction tends to increase. The horizontal axis in FIG. 8 is the angle of the movable frame 23 from a state in which the surface area over which the stationary-side electrode 271 and the movable-side electrode 272 of the first sub-driver 27A overlap in the sub-scanning axis C2 direction is at its maximum to a state in which the surface area over which the stationary-side electrode 271 and the movable-side electrode 272 of the second sub-driver 27B overlaps in the sub-scanning axis C2 direction reaches its maximum. Also, since the movable frame 23 is controlled so as to rotate at a constant angular velocity, it is possible to replace the rotational angle of the horizontal axis with time.

FIG. 8 shows the first drive signal Sg1 (solid line) given to the first sub-driver 27A, and the second drive signal Sg2 (broken line) given to the second sub-driver 27B. When the first drive signal Sg1 and second drive signal Sg2 shown in FIG. 8 are given to the first sub-driver 27A and the second sub-driver 27B, the movable frame 23 is rotated at a constant angular velocity around the sub-scanning axis C2. The first drive signal Sg1 and second drive signal Sg2 shown in FIG.

8 are determined based on drive signal voltage and the rotational angle shown in FIG. 7 and the configuration shown in FIG. 5.

As shown in FIG. 8, the first drive signal Sg1 is at maximum voltage when the surface area over which the stationary-side electrode 271 and the movable-side electrode 272 of the first sub-driver 27A overlap in the sub-scanning axis C2 direction is at its maximum. The first drive signal Sg1 is such that the voltage decreases as the surface area over which the stationary-side electrode 271 and the movable-side electrode 272 of the first sub-driver 27A overlap in the sub-scanning axis C2 direction becomes smaller, that is, as the movable frame 23 rotates. The second drive signal Sg2 is such that the voltage rises as the surface area over which the stationary-side electrode 271 and the movable-side electrode 272 of the second sub-driver 27B overlap in the sub-scanning axis C2 direction becomes larger, that is, as the movable frame 23 rotates. After this, the voltage reaches its maximum when the surface area over which the stationary-side electrode 271 and the movable-side electrode 272 of the second sub-driver 27B overlap in the sub-scanning axis C2 direction reaches its maximum.

Figure 9:
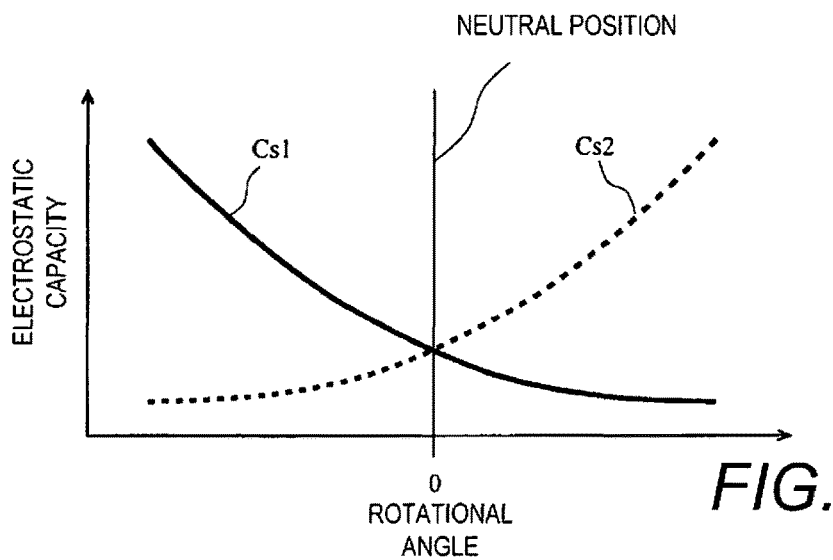
FIG. 9 is a graph of the relation between the electrostatic capacity of a capacitor and the rotational angle of the movable frame.

The change in the capacity of a capacitor as the movable frame 23 rotates will now be described. FIG. 9 is a graph of the relation between the electrostatic capacity of a capacitor and the rotational angle of the movable frame. The horizontal axis in FIG. 9 is the same as the horizontal axis in FIG. 8, and is the angle of the movable frame 23 when the center has an angle of 0° (neutral position). The vertical axis is the electrostatic capacity of the capacitor. The horizontal axis in FIG. 9 corresponds to the horizontal axis in FIG. 8, and can be replaced with change over time.

FIG. 9 shows the electrostatic capacity Cs1 (solid line) of the capacitor Cp1, and the electrostatic capacity Cs2 (broken line) of the capacitor Cp2. The electrostatic capacity of a capacitor increases in proportion to the surface area of the opposing electrodes. With the capacitor Cp1, the electrostatic capacity Cs1 is at its maximum when the surface area over which the stationary-side electrode 271 and the movable-side electrode 272 of the first sub-driver 27A overlap in the sub-scanning axis C2 direction is at its largest, that is, when the angle is at the left end in FIG. 9. Similarly, the electrostatic capacity Cs2 of the capacitor Cp2 is at its maximum when the surface area over which the stationary-side electrode 271 and the movable-side electrode 272 of the second sub-driver 27B overlap in the sub-scanning axis C2 direction is at its largest, that is, when the angle is at the right end in FIG. 9.

The current generated between the movable-side electrode 272 of the first sub-driver 27A and the movable-side electrode 272 of the second sub-driver 27B will now be described. When the movable frame 23 is rotated (pivoted) at a constant angular velocity, the voltage of the drive signals given to the first sub-driver 27A and the second sub-driver 27B, and the electrostatic capacities thereof, fluctuate along with the angle of the movable frame 23 (time).

With a capacitor, current is generated as the capacity changes. If we let the charge held in a capacity be a charge Q, the current I flowing to the capacitor is indicated by the amount of change in the charge Q per unit of time, so if we let t be time, this is expressed by the following formula.

$I=dQ/dt$

If we let V be the applied voltage and C be the electrostatic capacity of the capacitor, then the charge Q=CV. As discussed above, the applied voltage (drive signal voltage) and electrostatic capacity of the first sub-driver 27A (capacitor Cp1) and the second sub-driver 27B (capacitor Cp2) both vary with time. Therefore, the formula for current is as follows.

$I=C(dV/dt)+V(dC/dt)$ $C(dV/dt)$ is the component produced by a change in the drive signal voltage (the component of percentage change in the drive signal voltage). $V(dC/dt)$ is the component produced by a change in capacity (the component of percentage change in capacity). That is, the current flowing to the wire connecting the movable-side electrodes 272 is the sum of $C(dV/dt)$ and $V(dC/dt)$.

Figure 10:
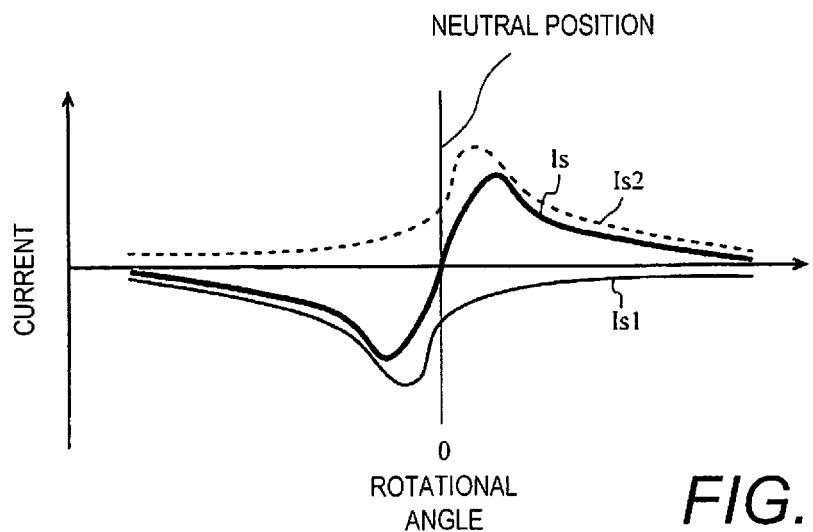
FIG. 10 is a graph of the relation between the current value and the rotational angle of the movable frame based on changes in the drive signal voltage.
Figure 11:
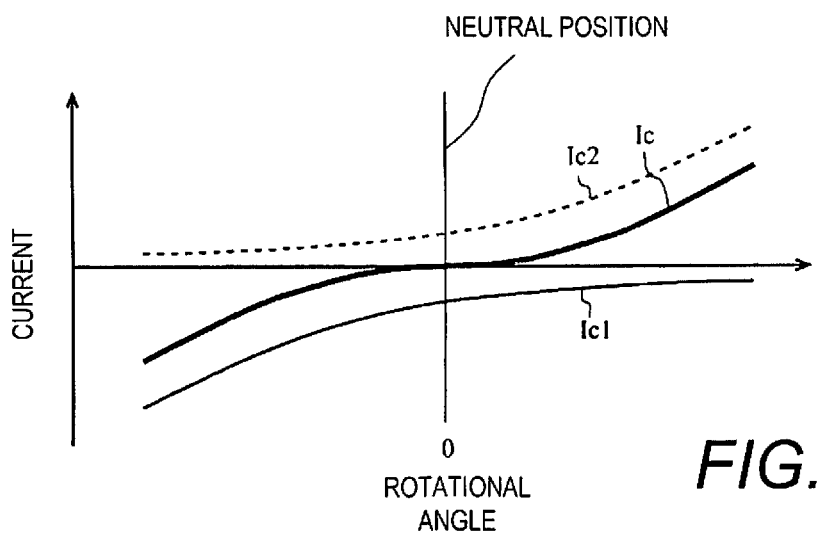
FIG. 11 is a graph of the relation between the current value and the rotational angle of the movable frame based on changes in the electrostatic capacity.
Figure 12:
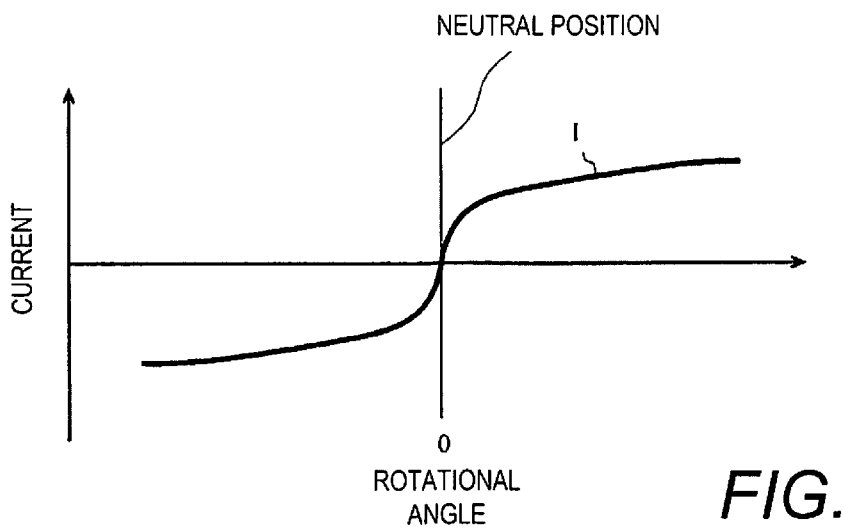
FIG. 12 is a graph of the relation between the rotational angle of the movable frame and a current value that is a combination of the current based on changes in the drive signal voltage and the current based on changes in the electrostatic capacity.

Next, the current flowing between the movable-side electrodes 272 of the first sub-driver 27A and the second sub-driver 27B will be described. FIG. 10 is a graph of the relation between the current value and the rotational angle of the movable frame based on changes in the drive signal voltage. FIG. 11 is a graph of the relation between the current value and the rotational angle of the movable frame based on changes in the electrostatic capacity. FIG. 12 is a graph of the relation between the rotational angle of the movable frame and a current value that is a combination of the current based on changes in the drive signal voltage and the current based on changes in the electrostatic capacity. The horizontal axis in FIGS. 10, 11 and 12 corresponds to that in FIGS. 8 and 9, and the rotational angle of the movable frame 23 can be replaced with operating time.

As discussed above, the current generated between the movable-side electrodes 272 is the combination (sum) of the component of percentage change in the drive signal voltage and the component of percentage change in capacity. The component of the current that is the percentage change in the drive signal voltage is a combination of the current generated at the first sub-driver 27A and the current generated at the second sub-driver 27B.

In view of this, when the drive signal shown in FIG. 8 is given to the first sub-driver 27A and the second sub-driver 27B, the current based on drive signal voltage will be proportional to the change in voltage over time. The current generated according to the rotational angle of the movable frame 23 is shown in FIG. 10.

The current Is1 (solid line) shown in FIG. 10 is the current generated at the movable-side electrode 272 of the first sub-driver 27A, which is generated by a change in the drive signal voltage, and the current Is2 (broken line) is the current generated at the movable-side electrode 272, which is generated at the second sub-driver 27B. The current Is1 and the current Is2 are proportional to the change in the drive signal voltage over time, so more current flows in a portion where the voltage is changing suddenly. Therefore, the current Is1 and the current Is2 change as shown in FIG. 10. The current Is1 and the current Is2 are such that in the graph of the drive signal in FIG. 8, there is more current in a portion where the voltage change is greater.

Combining the current Is1 and the current Is2 yields a proportional change component Is (thick line) of the drive signal voltage for the current generated between the movable-side electrode 272 of the first sub-driver 27A and the movable-side electrode 272 of the second sub-driver 27B as a result of pivoting of the movable frame 23.

Similarly, when the electrostatic capacity of a capacitor made up of the first sub-driver 27A and the second sub-driver 27B varies as shown in FIG. 9, the current based on a change in electrostatic capacity will be proportional to the change in electrostatic capacity over time. Therefore, the current generated by a change in electrostatic capacity is as shown in FIG. 11.

The current Ic1 shown in FIG. 11 (solid line) is current generated at the movable-side electrode 272 of the first sub-driver 27A by a change in the electrostatic capacity of the capacitor Cp1. Also, the current Ic2 (broken line) shown in FIG. 11 is current generated at the movable-side electrode 272 of the second sub-driver 27B by a change in the electrostatic capacity of the capacitor Cp2. The current Ic1 and the current Ic2 are proportional to a change in the electrostatic capacity over time. Therefore, the current Ic1 and the current Ic2 change as shown in FIG. 11 according to the rotational angle of the movable frame 23.

Combining the current Ic1 and the current Ic2 yields a proportional change component Ic (thick line) of the electrostatic capacity for the current generated between the movable-side electrode 272 of the first sub-driver 27A and the movable-side electrode 272 of the second sub-driver 27B as a result of pivoting of the movable frame 23.

As discussed above, the current I generated by rotation of the movable frame 23 is the sum of the proportional change component (current) Is of the drive signal voltage and the proportional change component (current) Ic of the electrostatic capacity. FIG. 12 shows the current that flows between the movable-side electrode 272 of the first sub-driver 27A and the movable-side electrode 272 of the second sub-driver 27B as a result of rotation of the movable frame 23, and shows a combination of the current Is shown in FIG. 10 and the current Ic shown in FIG. 11.

As shown in FIG. 12, the current generated at the sub-drivers 27 when the movable frame 23 rotates has a larger amplitude, that is, more current is flowing, when one stationary-side electrode 271 and one movable-side electrode 272 are in close proximity. When the movable frame 23 is parallel to the fixed frame 22 (horizontal), the current is zero, and when it touches the opposite side, the current value increases, although the direction of flow is opposite. That is, the current value is zero when the movable frame 23 is parallel to the fixed frame 22, and the current value rises in proportion to the angle from horizontal and how close the stationary-side electrode 271 is to the movable-side electrode 272. That is, the current value sensed at the sub-drivers 27 exhibits a behavior that results in symmetry depending on the angle from horizontal, although the sign reverses (the flow of the current goes in the opposite direction).

As discussed above, the horizontal axis in FIG. 12 is the rotational angle of the movable frame 23, and can also be considered to be time. Therefore, with the optical scanning element 20, the rotation (pivoting) state of the movable frame 23 (amplitude, frequency, etc.) can be sensed from the current that merges between the movable-side electrodes 272 of the first sub-driver 27A and the second sub-driver 27B.

With the optical scanning device A, the current sensor 36 senses the current generated at the sub-drivers 27 by means of the rotation of the movable frame 23 with respect to the fixed frame 22. The current sensor 36 outputs current information from the sensed current. Next, the current sensor 36 will be described in detail through reference to the drawings.

Figure 13:
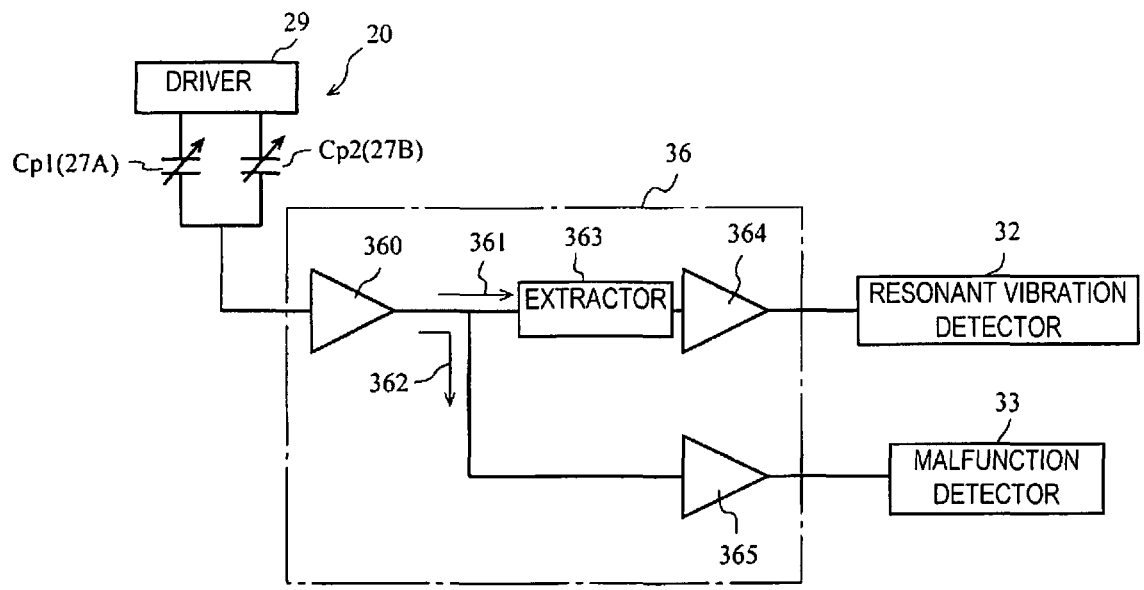
FIG. 13 is a circuit diagram of an example of the current sensor used in the optical scanning device pertaining to the present invention.

FIG. 13 is a circuit diagram of an example of the current sensor used in the optical scanning device pertaining to the present invention. In the circuit shown in FIG. 13, for the sake of convenience, an equivalent circuit of the pair of sub-drivers 27 (a diagram in which the capacitors Cp1 and Cp2 are connected in parallel) is also shown. As shown in FIG. 13, the current sensor 36 comprises an I/V converter 360, a first path 361, a second path 362, an extractor 363 (e.g., extraction component), a first amplifier 364, and a second amplifier 365. Thus, in the illustrated embodiment, as shown in FIG. 13, the current sensor 36 includes the first path 361 and the second path 362 that is parallel to the first path 361.

The wires connected to the movable-side electrodes 272 of the first sub-driver 27A and the second sub-driver 27B are connected to an input component of the I/V converter 360. The I/V converter 360 is an element that converts the sensed current into voltage. Specifically, the current generated when the movable frame 23 rotates with respect to the fixed frame 22 is converted by the I/V converter 360 into corresponding voltage. Although the I/V converter 360 converts current into voltage, the characteristics of the current, such as its frequency, are preserved after conversion into voltage. As to amplitude, it can be acquired by computation from the voltage signal based on a correspondence table for when current is converted into voltage, which is provided to the memory component 400.

The extractor 363 and the first amplifier 364 are provided along the first path 361. The second amplifier 365 is provided along the second path 362. The voltage outputted from the I/V converter 360 is inputted to the extractor 363 of the first path 361 and the second amplifier 365 of the second path 362.

The extractor 363 extracts the resonant vibration frequency included in the inputted voltage. Accordingly, the extractor 363 has a configuration that includes a bandpass filter that transmits resonance frequency signals. The signal for the resonance frequency component extracted by the extractor 363 is amplified by the first amplifier 364. The extractor 363 extracts the resonant vibration component generated during rotation of the movable frame 23, and the signal amplified by the first amplifier 364 is sent to the resonant vibration detector 32. Thus, in the illustrated embodiment, the current sensor 36 has the extractor 363 that is configured to extract the resonance frequency of the resonant vibration from the sensed current, and the first amplifier 364 that is configured to amplify the output from the extractor 363 on the first path 361.

Meanwhile, on the second path 362, the voltage outputted from the I/V converter 360 is directly amplified by the second amplifier 365. This amplified voltage is then supplied as current information to the malfunction detector 33. As discussed above, current generated at the sub-drivers 27 by rotation of the movable frame 23 is sensed, and the I/V converter 360 converts this current into voltage. Accordingly, the voltage supplied to the malfunction detector 33 has the characteristics of the current generated at the sub-drivers 27. Thus, in the illustrated embodiment, the current sensor 36 has the second amplifier 365 that is configured to amplify the sensed current.

Next, the operation for detecting stoppage of the movable frame 23 or other such malfunctions by the malfunction detector 33 will be described.

When the drawing of video to the screen Sc is commenced in the optical scanning device A, the malfunction detector 33 acquires as sensed current the output of the second amplifier 365 of the current sensor 36 at the desired number of sampling points (such as 100 points). The malfunction detector 33 acquires the current waveform of the sensed current from the sensed current at each of the sampling points, compares the current waveform of the sensed current with a reference current waveform stored in the memory component 400, and determines whether or not the movable frame 23 has stopped or is otherwise in a malfunction state.

Figure 14:
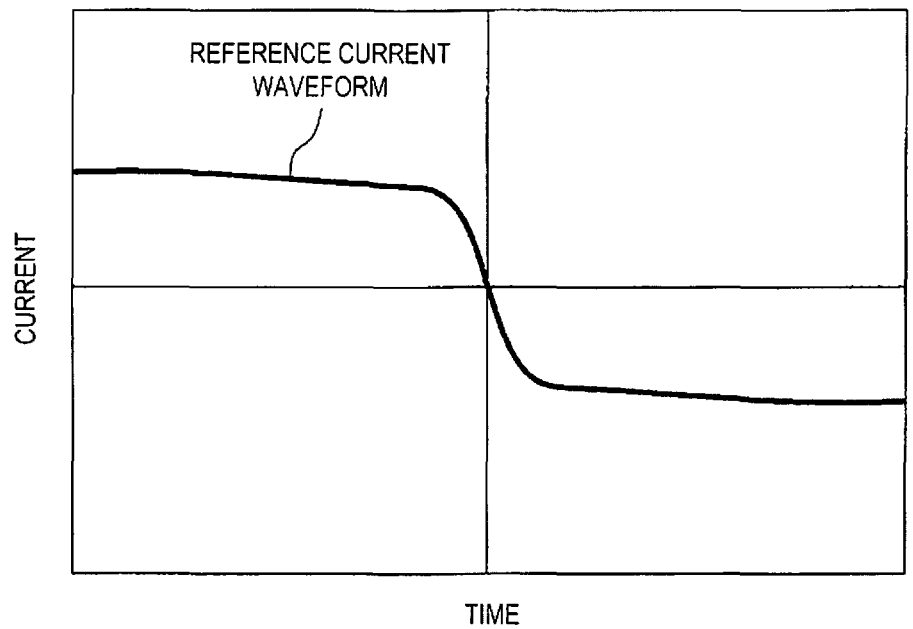
FIG. 14 is a graph of the reference current waveform used when detecting stoppage.

FIG. 14 is a graph of the reference current waveform used when detecting a malfunction at the movable frame 23. In the optical scanning device A, there is often a difference from one optical scanning element 20 to the next, and variance occurs in the scanning of the light beam. Even though the light beam is scanned under specific conditions (such as scanning speed), the current that is sensed is almost always going to be different. Therefore, with the optical scanning device A, the optical scanning element 20 is operated normally at the time of its manufacture, current sensing is performed, and a current waveform is formed from the current information obtained from the current sensor 36. This current waveform is stored as a reference current waveform (e.g., predetermined reference current) in the memory component 400. The current waveform shown in FIG. 14 is inverted by the I/V converter 360, so it is inverted up and down with respect to the waveform in FIG. 12, but otherwise the shape (characteristics) corresponds to FIG. 12.

The malfunction detector 33 acquires the current waveform obtained from the current value sampled at each of the sampling points. The malfunction detector 33 then compares the current waveform with the reference current waveform, and determines that the system is operating normally if the discrepancy falls within a set range. If the difference between the current waveform from the sensed current and the reference current waveform is greater than a certain amount, then the malfunction detector 33 detects stoppage (malfunction) of the movable frame 23. If the malfunction detector 33 detects stoppage of the movable frame 23, the light source controller 311 sends the driver 15 emission control information to the effect that light emission is to be forcibly stopped, or its output is to be lowered to the extent that the user will not suffer any health hazard if irradiated. Thus, in the illustrated embodiment, the controller 31 compares the current waveform of the sensed current with the reference current waveform, and controls the emission of the light beam from the light source component 100 according to comparison of the current waveform of the sensed current with the reference current waveform. Specifically, in the illustrated embodiment, the reference current waveform indicates current for when the movable frame 23 is being driven normally (without malfunction). Also, in the illustrated embodiment, the controller 31 controls the emission of the light beam from the light source component 100 when the difference between the current waveform of the sensed current and the reference current waveform is greater than a certain amount (or exceeds a predetermined range). Also, in the illustrated embodiment, the controller 31 compares the values of the current waveform of the sensed current and the reference current waveform at the same timing, and reduces the emission of the light beam from the light source component 100 when the difference of the values is greater than the certain amount (e.g., predetermined threshold).

The result of the above is that even if the movable frame 23 comes to a stop and the light beam is no longer being scanned, it is less likely that the light beam will shine on a certain location and that the irradiated location will become hot or be degraded. Also, it is less likely that the light beam will be continuously shined into the user's eyes, etc., which could impair the user's vision, result in blindness, or create some other health hazard. Furthermore, the configuration here is such that the malfunction detector 33 determines the number of sampling points, and the output from the current sensor 36 is sampled for these sampling points, but this is not the only option. For example, the configuration may be such that the current sensor 36 determines the number of sampling points, and the output corresponding to the sampling points is passed on to the malfunction detector 33.

Next, the detection of stoppage of the movable frame 23 or other such malfunction by the malfunction detector 33 will be described. With the optical scanning device A pertaining to the present invention, the current sensor 36 senses current generated at the sub-drivers 27 based on pivoting of the movable frame 23, and malfunction at the movable frame 23 is detected based on a change in this current by the malfunction detector 33. The current generated at the sub-drivers 27 has a proportional change component for the drive signal voltage and a proportional change component for the electrostatic capacity.

Therefore, if a malfunction occurs in the drive signal (such as when no drive signal is supplied), the proportional change component for the drive signal voltage of the current generated at the sub-drivers 27 will change with respect to normal operation. For instance, let us consider a situation in which the drive signal is no longer supplied. If we assume that the drive signal voltage has dropped to zero, there is no change in the drive signal, so the proportional change component for the drive signal voltage of current generated at the sub-drivers 27 will also be zero. Also, since the proportional change component for the electrostatic capacity is $V(cD/dt)$, if the voltage V is zero, the proportional change component for the electrostatic capacity will also be zero. Because of the above, the malfunction detector 33 can detect a malfunction in the movable frame 23 caused by a malfunction in the drive signal by using the current sensor 36 to sense the current generated at the sub-drivers 27. Specifically, the malfunction detector 33 is able to detect a malfunction (such as stoppage) in the operation of the movable frame 23 due to a disconnection in a circuit, an increase in resistance, or some other problem with the wiring.

There are also situations when the movable frame 23 is forcibly stopped because of entry by a foreign object of the like. In such a case, the same drive signal as during normal operation is supplied to the sub-drivers 27. Since the movable frame 23 is stopped, the electrostatic capacity of the capacitors Cp1 and Cp2 stops changing. That is, the proportional change component for the electrostatic capacity of the current generated at the sub-drivers 27 goes to zero. Also, since the proportional change component for the drive signal voltage of the current generated at the sub-drivers 27 is $C(dV/dt)$, and the electrostatic capacity of the capacitors Cp1 and Cp2 is constant, the proportional change component for the drive signal voltage also changes. Therefore, the malfunction detector 33 can detect that the movable frame 23 has been forcibly stopped, by using the current sensor 36 to sense the current generated at the sub-drivers 27. Since the electrostatic capacity of the capacitors Cp1 and Cp2 will vary depending on the position where the movable frame 23 was forcibly stopped, the waveform of the current sensed by the current sensor 36 will vary with the stop position of the movable frame 23. The waveform of the current sensed by the current sensor 36 will now be described for each stop position of the movable frame 23.

First, we will describe a situation in which the movable frame 23 has stopped parallel to the fixed frame 22 (this is the neutral position for the rotation of the movable frame 23). Because the movable frame 23 is stopped, the current generated at the sub-drivers 27 only has a proportional change component for the drive signal voltage. Furthermore, as discussed above, the proportional change component of the drive signal voltage is proportional to the capacity of a capacitor.

When the movable frame 23 is in the neutral position, the electrostatic capacity of the capacitor Cp1 and the capacitor Cp2 is fixed at the value of the neutral position shown in FIG. 11. The electrostatic capacity of the capacitor Cp1 is substantially the same as that of the capacitor Cp2 at the neutral position. Therefore, the proportional change component for the drive signal voltage is obtained by eliminating the effect caused by a change in electrostatic capacity from the proportional change component Is for the drive signal voltage in FIG. 10.

Figure 15:
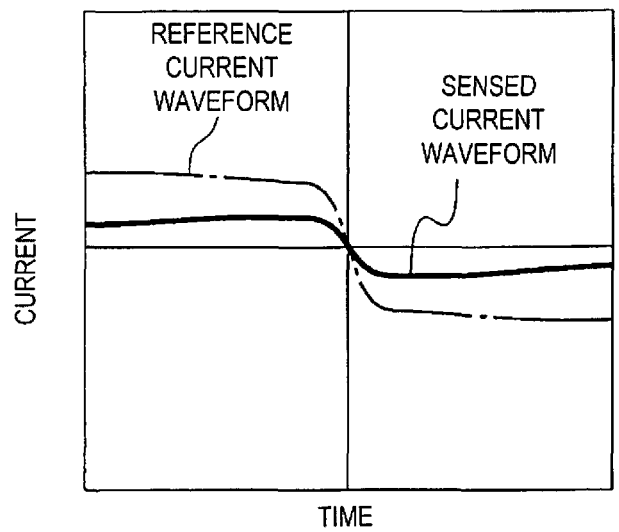
FIG. 15 is a graph of the change in the current value in the drawing period when the movable frame has stopped in a state of being parallel to the fixed frame.

FIG. 15 is a graph of the change in the current value in the drawing period when the movable frame has stopped in a state of being parallel to the fixed frame. The current generated at the sub-drivers 27 is such that the proportional change component for the electrostatic capacity is zero. That is, the current generated at the sub-drivers 27 is just the proportional change component for the drive signal voltage. The proportional change component for the drive signal voltage is also subject to the effect of no change in the electrostatic capacity of the capacitors Cp1 and Cp2. Specifically, the current waveform of the current generated at the sub-drivers 27 when the movable frame 23 is stopped in the neutral position is the waveform shown in FIG. 15. The waveform in FIG. 15 has a smaller overall amplitude than the reference current waveform shown in FIG. 14. The amplitude is smaller at the two ends of the pivoting of the movable frame 23. because the capacitor Cp1 has the same or substantially the same electrostatic capacity as the capacitor Cp2, the current waveform of the current generated at the sub-drivers 27 is in symmetry depending on the angle from horizontal, although the sign reverses (the flow of the current goes in the opposite direction).

Figure 16:
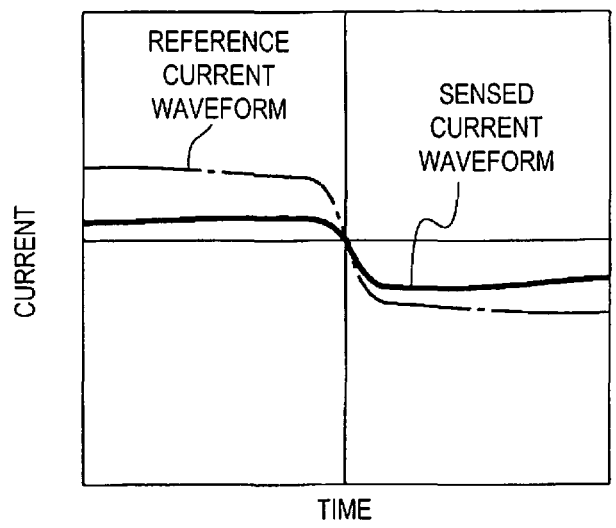
FIG. 16 is a graph of the change in the current value in the drawing period when the movable frame has stopped in a state of being at maximum inclination to the fixed frame.

FIG. 16 is a graph of the change in the current value in the drawing period when the movable frame has stopped in a state of being at maximum inclination to the fixed frame. There are situations in which the movable frame 23 stops in a state in which the surface area over which the stationary-side electrode 271 and the movable-side electrode 272 overlap in the sub-scanning axis C2 direction for one of the first sub-driver 27A and the second sub-driver 27B is larger relative to that for the other. Here, the surface area over which the stationary-side electrode 271 and the movable-side electrode 272 on the second sub-driver 27B side overlap in the sub-scanning axis C2 direction is assumed to be larger than that on the first sub-driver 27A side.

Here again, since the movable frame 23 is stopped, the proportional change component for the electrostatic capacity of the current generated at the sub-drivers 27 is zero. Also, the electrostatic capacity of the capacitor Cp2 is greater than when the stop is at the neutral position mentioned above, and the electrostatic capacity of the capacitor Cp1 is less than when the stop is at the neutral position.

Since the electrostatic capacity of the capacitor Cp1 is less than when the movable frame 23 is in the neutral position, at the portion to the right of the neutral position, the amplitude is smaller than when the stop is at the neutral position, that is, to the left of the neutral position of the current waveform shown in FIG. 15. Conversely, at the portion to the left of the neutral position, the amplitude is larger than when the stop is at the neutral position, that is, to the right of the neutral position of the current waveform shown in FIG. 15. As shown in FIG. 16, when the movable frame 23 is stopped at an angle either way to the neutral position, the current value generated at the sub-drivers 27 will not be symmetrical flanking the neutral position. The current waveform shown in FIG. 16 has a shape in which the amplitude decreases at both ends, just as in FIG. 15.

When the movable frame 23 is forcibly stopped, the current waveform of the current generated at the sub-drivers 27 sensed by the current sensor 36 has a different shape from that of the reference current waveform during normal operation. The malfunction detector 33 detects a change in the current waveform versus the reference current waveform from the sensed current information, and thereby detects the forced stoppage of the movable frame 23 and the stoppage (malfunction) of the movable frame 23 due to a malfunction in the drive signal. More specifically, the malfunction detector 33 calls up the reference current waveform stored ahead of time in the memory component 400, compares the reference current waveform to the current waveform of the sensed current, and detects stoppage (malfunction) of the movable frame 23 if this discrepancy is outside a specific range.

A situation in which the rotation (pivoting) of the movable frame 23 with respect to the fixed frame 22 was described above, but this is not the only option. For example, the current waveform will also change when the rotational angle is suppressed, or when there is a change in the rotational speed (slower or faster). Therefore, the malfunction detector 33 can also detect a malfunction in the movable frame 23 in which the movable frame 23 is performing an operation other than its predetermined operation, by comparing the sensed current waveform to the reference current waveform. As discussed above, the malfunction detector 33 also sends the light source controller 311 information to the effect that a malfunction was detected when a malfunction other than the stoppage of the movable frame 23 has been detected. This information may be the same as stop information, or it may be other information besides stop information.

Accordingly, with the optical scanning device A, even though no special sensor is attached for sensing the scanning of the light beam or the mirror 21 (movable frame 23), malfunctions such as stoppage that occur in a state in which a drive signal for normal operation is being given can still be detected.

In the current sensor 36, the first amplifier 364 inputs only signals with the frequency band (resonance frequency) extracted by the extractor 363. A signal amplified by the first amplifier 364 is sent to the resonant vibration detector 32 and used for detection of resonant vibration. Since the current generated by resonant vibration is small, it needs to have a high amplification ratio. On the other hand, a signal amplified by the second amplifier 365 is sent to the malfunction detector 33 and used for detection of malfunction (stoppage) of the movable frame 23. If malfunction (stoppage) occurs at the movable frame 23, the amount of change between the current generated at the sub-drivers 27 and the current during normal operation is larger than the current generated by resonant vibration. The second amplifier 365 is used to directly amplify a signal that has been converted by the I/V converter 360. Therefore, the second amplifier 365 can be one with a lower amplification ratio than that of the first amplifier 364.

In this embodiment, current generated at the sub-drivers 27 by the operation of the movable frame 23 in the drawing period is sensed, and this current is used to detect stoppage (malfunction) of the movable frame 23. As discussed above, since the movable frame 23 moves more slowly in the drawing period than in the return period, the current value will be smaller, but because the period is long, it is possible to acquire an accurate current waveform even with a low sampling frequency. Thus, in the illustrated embodiment, the controller 31 controls the emission of the light beam from the light source component 100 based on the sensed current (e.g., sensing result) acquired from the current sensor 36 for either the return period or the drawing period As discussed above, with the optical scanning device A pertaining to the present invention, since stoppage (malfunction) of the movable frame 23 is detected based on the current value generated during the operation of sub-scanning, stoppage (malfunction) of the optical scanning element 20 can be quickly and accurately detected. And since the operation of stopping the light source 11 or reducing its output is performed immediately after detection of stoppage (malfunction) of the movable frame 23, it is less likely that the high-output light beam will be shined into the user's eyes, so impairment of the user's vision, blindness, or other such health hazards are less likely to occur. Also, since it is less likely that the high-output light beam will continue to irradiate a single point, it is also possible suppress overheating, material degradation, and so forth that would otherwise be caused by irradiation with the light beam.

Thus, in the illustrated embodiment, the controller 31 stops or reduces the emission of the light from the light source component 100.

Also, in the illustrated embodiment, the optical scanning device A has the electrostatic sub-driver 27 that drives the movable frame 23 with dissonance, the current sensor 36 that senses current generated by the change in the capacity of the sub-driver 27 and outputs the current information signal based on the current, and the malfunction detector 33 that detects the stop from the current information signal and outputs stop detection information. The emission of the light beam is stopped or its output is reduced based on the stop detection information.

Second Embodiment

Another example of the optical scanning device pertaining to the present invention will be described. The optical scanning device pertaining to this embodiment has the same configuration as the optical scanning device pertaining to the first embodiment. Therefore, those portions that are substantially the same will be numbered the same, and these portions that are the same will not be described again in detail.

With the malfunction detector 33 of the optical scanning device pertaining to the first embodiment, current information was acquired at many sampling points (such as 100 points), the current waveform was acquired based on the current information for these sampling points, and this waveform was compared to a reference current waveform to detect stoppage (malfunction) of the movable frame 23. If there are many sampling points, the current waveform precision is higher, but higher processing capability is also required.

Figure 17:
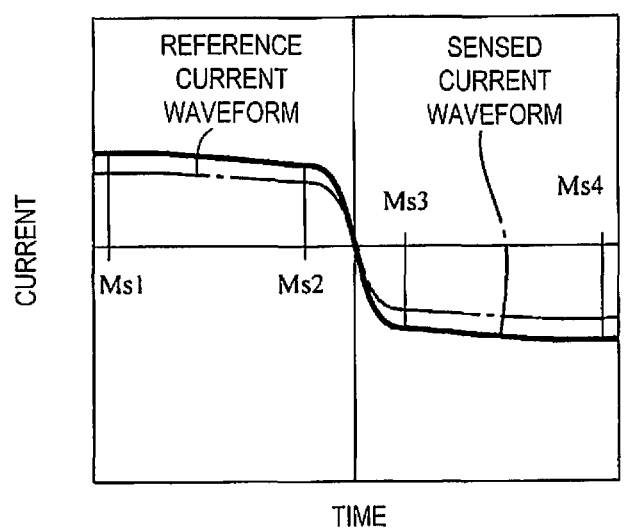
FIG. 17 is a graph of the current waveform and feature points.

FIG. 17 is a graph of the current waveform and feature points. The waveform of current sensed during the drawing period is dependent on the operating (pivoting) state of the movable frame 23. Because of this, as shown in FIG. 17, the current information is sensed using just a few (four here) sampling points at which there is a large shape change in the current waveform (change in the current value). Here, a first measurement point Ms1 after a switch from the return period to the drawing period, and a second measurement point Ms2 before the movable frame 23 moves to the neutral position are set as sampling points. Also set are a third measurement point Ms3 after the movable frame 23 has passed the neutral position, and a fourth measurement point Ms4 before a switch from the drawing period to the return period. The first measurement point Ms1, the second measurement point Ms2, the third measurement point Ms3, and the fourth measurement point Ms4 are points at which a stable current value can be sensed.

The scanning controller 312 acquires the start and end times of the return period and the drawing period when the operation of the movable frame 23 is controlled. Therefore, the scanning controller 312 can pass on the timing of the first measurement point Ms1, the second measurement point Ms2, the third measurement point Ms3, and the fourth measurement point Ms4 correctly to the malfunction detector 33 or the current sensor 36. This allows the malfunction detector 33 to correctly acquire the current value (current waveform) at the first measurement point Ms1, the second measurement point Ms2, the third measurement point Ms3, and the fourth measurement point Ms4.

When the movable frame 23 is operating normally, the current values at the first measurement point Ms1, the second measurement point Ms2, the third measurement point Ms3, and the fourth measurement point Ms4 from the current sensor 36 will coincide or substantially coincide (the difference will fall within a specific range) with the current values at corresponding points of the reference current waveform.

Meanwhile, as mentioned above, when the movable frame 23 is forcibly stopped, the current values sensed at the various measurement points will vary with respect to the current values obtained from the reference current waveform. Therefore, the malfunction detector 33 compares the current values sensed at the various measurement points to the current values at the corresponding points on the reference current waveform, and stoppage of the movable frame 23 is detected if the difference between them is a certain amount or more.

As shown in FIG. 16, when the movable frame 23 stops, the current waveform of the sensed current may itself differ from the waveform sensed up to that point. Specifically, the change may differ between before and after the movable frame 23 passes the neutral position. In such a case, it is possible to detect stoppage of the movable frame 23 by comparing the sensed current values. For example, when the optical scanning element 20 is in its normal operating state, the current waveform will exhibit symmetrical or substantially symmetrical behavior (waveform) before and after the movable frame 23 passes the neutral position. When the movable frame 23 is stopped, symmetry of the current waveform may be lost, and this loss of symmetry can also be utilized to detect the stoppage of the movable frame 23.

To explain this in further detail, during normal operation, the same or substantially the same amount of current flows at the first measurement point Ms1 and the fourth measurement point Ms4, although the signs are different (the direction of flow is different). The same applies to the second measurement point Ms2 and the third measurement point Ms3. That is, when the movable frame 23 stops, the current value at the first measurement point Ms1 and the current value at the fourth measurement point Ms4 deviate from the current value at the second measurement point Ms2 and the third measurement point Ms3 (the balance in the current waveforms is lost). The malfunction detector 33 detects stoppage of the movable frame 23 when the difference in the current values at these various measurement points is a certain amount or more.

Furthermore, there may be situations when the position is limited or the movement speed is limited before or after the neutral position during the rotation (pivoting) of the movable frame 23. In such a situation, the balance changes at the portion of the current waveform before or after the neutral position. In view of this, the malfunction detector 33 compares the first measurement point Ms1 and the second measurement point Ms2, and/or compares the third measurement point Ms3 and the fourth measurement point Ms4. The malfunction detector 33 then detects that a malfunction has occurred in the rotation of the movable frame 23 if the difference is more than a certain value.

There are also times when the waveform itself varies before and after the neutral position of the movable frame 23, and a malfunction in the rotation of the movable frame 23 can also be determined by comparing the difference between the first measurement point Ms1 and the second measurement point Ms2 to the difference between the third measurement point Ms3 and the fourth measurement point Ms4, and seeing if there is at least a certain gap between these differences. Thus, in these cases, the controller 31 compares the values of the current waveform of the sensed current sensed at different timings (e.g., Ms1, Ms2, Ms3, Ms4), and controls the emission of the light beam from the light source component 100 according to the comparison of the values of the current waveform of the sensed current.

As discussed above, the current values at a number of points indicating the features of the current waveform are compared to the current values at corresponding points of a reference current waveform that has been stored ahead of time, or the current values at feature points are compared among themselves, so the amount of processing required to detect stoppage (malfunction) can be greatly reduced. Therefore, the time it takes from stoppage of the movable frame 23 (the occurrence of a malfunction) until this is detected can be shortened.

Everything else is the same as in the first embodiment. The current sensor 36 senses the current value generated at the sub-drivers 27 in the drawing period in the first and second embodiments, but this is not the only option, and the current value generated at the sub-drivers 27 in the return period may be sensed instead.

Third Embodiment

Figure 18:
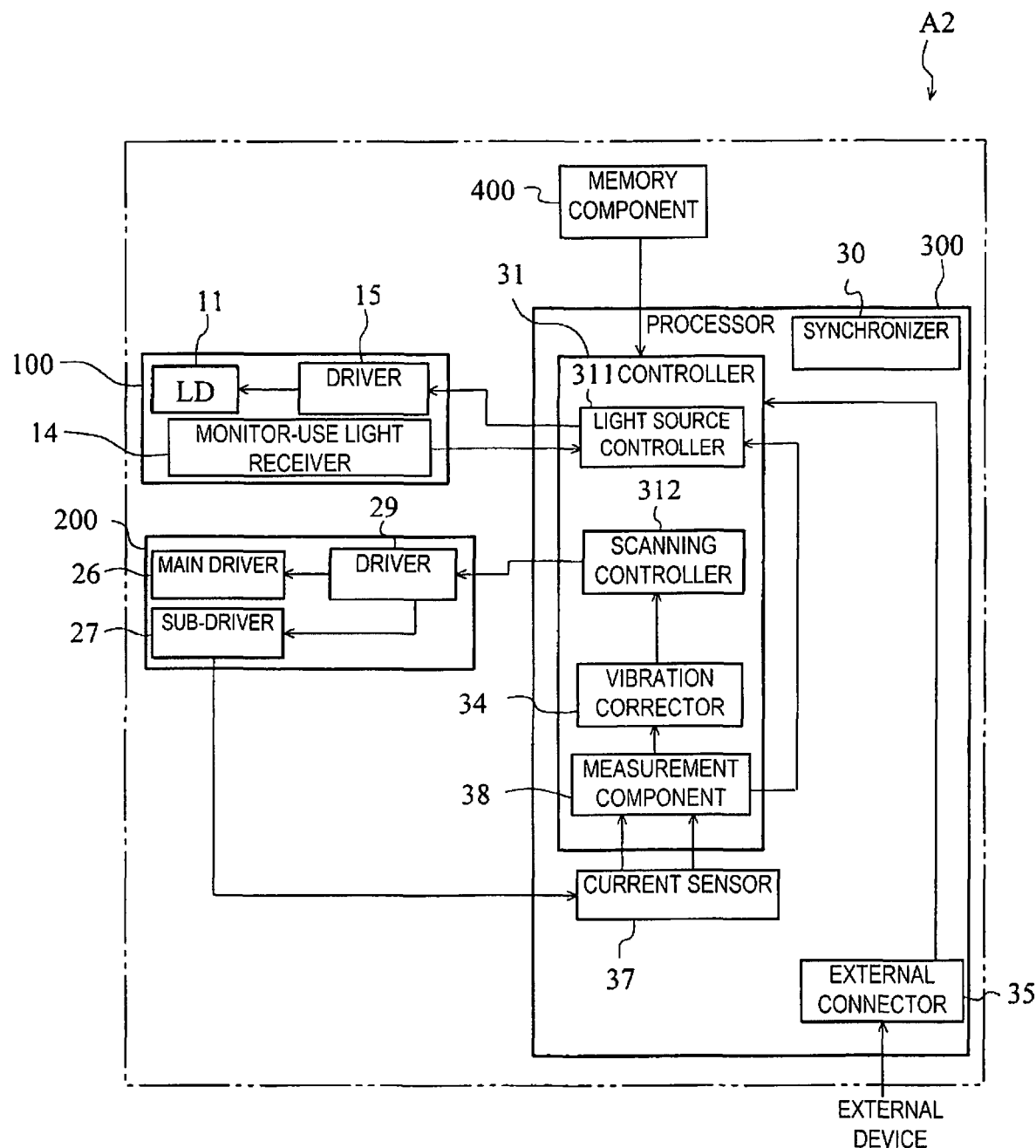
FIG. 18 is a block diagram of another example of the optical scanning device pertaining to the present invention.
Figure 19:
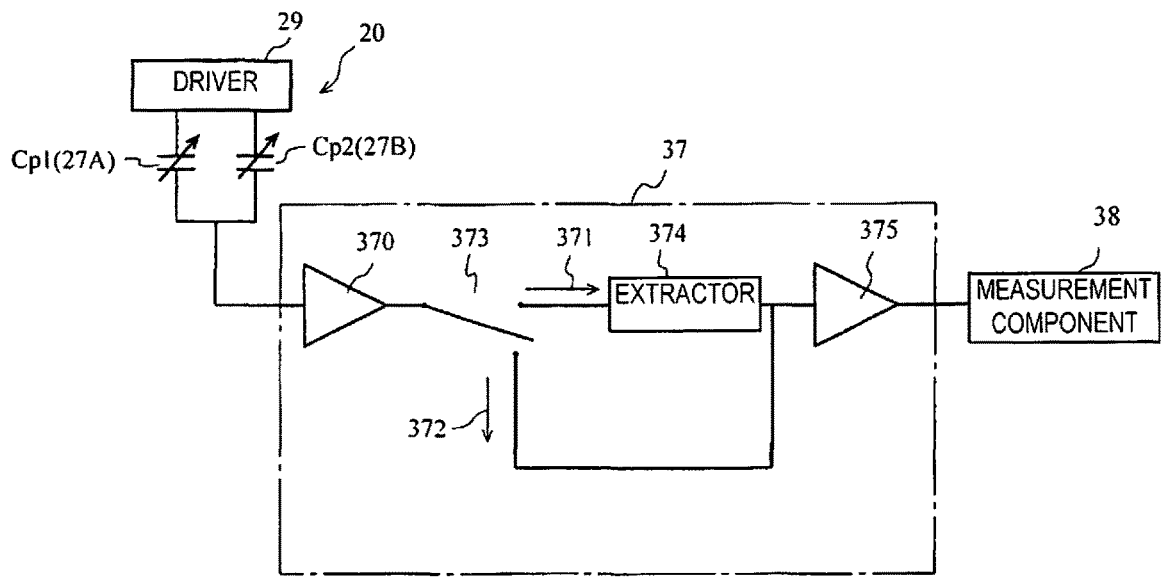
FIG. 19 is a circuit diagram of the current sensor used in the optical scanning device shown in FIG. 18.

Another example of the optical scanning device pertaining to the present invention will now be described through reference to the drawings. FIG. 18 is a block diagram of another example of the optical scanning device pertaining to the present invention. FIG. 19 is a circuit diagram of the current sensor used in the optical scanning device shown in FIG. 18. As shown in FIG. 18, the optical scanning device A2 has the same configuration as the optical scanning device A shown in FIG. 2, except that a current sensor 37 and a measurement component 38 of the processor 300 are different. Therefore, those portions of the optical scanning device A2 that are the same as in the optical scanning device A will be numbered the same, and portions that are the same will not be described in detail again.

As shown in FIG. 18, the processor 300 of the optical scanning device A2 comprises the measurement component 38, which combines the resonant vibration detector 32 and the malfunction detector 33 into one component. The measurement component 38 acquires the resonant vibration frequency and detects the stoppage (malfunction) of the movable frame 23 based on current information from the current sensor 37. These operations themselves are the same as those of the resonant vibration detector 32 and the malfunction detector 33 in the optical scanning device A, and so will not be described in detail.

The current sensor 37 comprises an I/V converter 370, a first path 371, a second path 372, a switch 373, an extractor 374, and an amplifier 375. The I/V converter 370 is the same as the I/V converter 360. The first path 371 comprises the extractor 374, and the extractor 374 is the same as the extractor 363, and is a filter that extracts just the wavelength component of the resonance frequency from the inputted voltage. The extractor 374 is connected to the input of the amplifier 375.

The second path 372 is a path that bypasses the extractor 374, and is connected to the input of the amplifier 375. The switch 373 selectively connects the output terminal of the I/V converter 370 to either the first path 371 or the second path 372 based on a frame synchronization signal from the synchronizer 30.

As discussed above, lightness or darkness is generated in the sub-scanning direction in the video projected on the screen Sc when resonant vibration is generated at the movable frame 23, which is driven by dissonance. In order to suppress this lightness or darkness in the video caused by resonant vibration, the detection of resonant vibration is preferably performed in the drawing period. Also, the current value is greater when the rotational speed of the movable frame 23 is higher. Therefore, malfunction in the movable frame 23 can be detected more accurately by sensing the current generated in the return period.

Because of this, the current generated in the drawing period is utilized for detecting the resonant vibration of the movable frame 23. Also, the current generated in the return period is utilized for detecting stoppage (malfunction). Therefore, the switch 373 connects to the first path 371 in the drawing period and to the second path 372 in the return period.

The voltage (signals) that has passed through the first path 371 and the second path 372 is amplified by the amplifier 375 and inputted to the measurement component 38. The measurement component 38 is similar to the switch 373 in that it acquires information about the return period and the drawing period from the scanning controller 312, operates as a resonant vibration detector during the drawing period, and as a malfunction detector during the return period. The measurement component 38 may perform different processing according to the inputted signal, that is, it may perform resonant vibration detection or detection of stoppage (malfunction) of the movable frame 23.

As discussed above, the voltage outputted from the I/V converter 370 is sent by the switch 373 to the first path 371 in the drawing period, and is sent to the second path 372 in the return period. Therefore, the amplifier 375 can be shared by resonance detection and malfunction detection, so the current sensor can be simplified. The amplifier 375 may have a fixed amplification ratio, or the amplification ratio may be variable. For example, a low current value is generated in the drawing period in which the movable frame 23 is rotating slowly. Therefore, current generated by resonance can be accurately sensed by raising the amplification ratio in the drawing period. Conversely, a high current value is generated in the return period in which the movable frame 23 is rotating faster than in the drawing period. Therefore, even if the amplification ratio is lowered in the return period in which the high current value is generated, a change in the current can be accurately detected. Also, since the return period is shorter (in time) than the drawing period, the frequency band must be widened by lowering the amplification ratio. Here again, a change in the current in the return period can be accurately detected by lowering the amplification ratio in the return period below that in the drawing period.

The rest of the features are the same as in the first and second embodiments.

Fourth Embodiment

Figure 20:
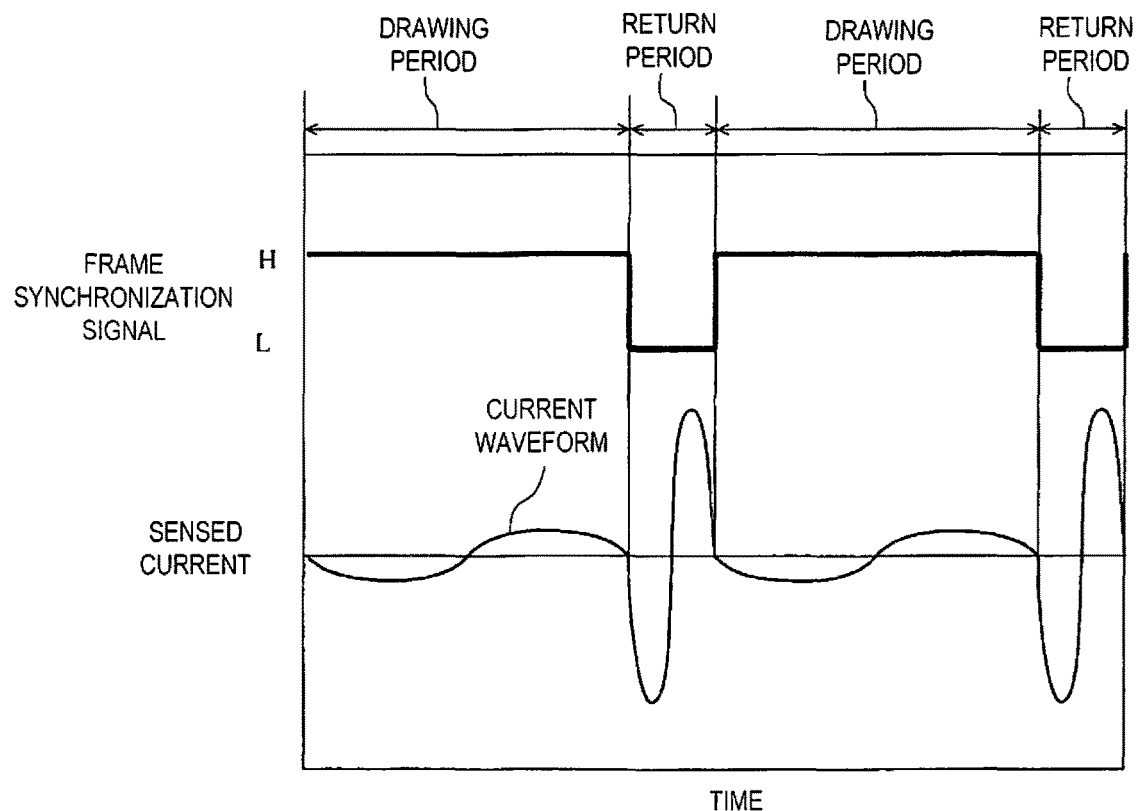
FIG. 20 is a graph of a frame synchronization signal and the current waveform of current sensed by the current sensor.

Yet another example of the optical scanning device pertaining to the present invention will be described through reference to the drawings. FIG. 20 is a graph of a frame synchronization signal and the current waveform of current sensed by the current sensor. The upper part in FIG. 20 is the frame synchronization signal, and the lower part is the current waveform. The horizontal axis is time. The optical scanning device pertaining to the present invention here has the same configuration as the optical scanning device A in the first embodiment, and will not be described in detail again, and will be described through reference to the optical scanning device A.

As shown in FIG. 20, the frame synchronization signal is a signal that is low (L) in the return period and high (H) in the drawing period. One frame is made up of a set of a return period and a drawing period. If we assume that the current sensor 36 also senses current in the return period, the waveform of the current sensed in the return period and the drawing period is as shown in FIG. 20. That is, the maximum amplitude of the current waveform in the return period is greater than the maximum amplitude of the current waveform in the drawing period.

As discussed above, the operation of the movable frame 23 is controlled so that it rotates slowly in the drawing period and rotates faster in the return period. Because of this, the voltage of the drive signal that drives the sub-drivers 27 is higher in the return period than in the drawing period. Accordingly, the proportional change in voltage (the change over time) is greater in the return period than in the drawing period, and the proportional change component of the drive signal voltage for current generated during pivoting of the movable frame 23 is larger. Also, since the proportional change in the electrostatic capacity increases along with the speed of the movable frame 23, the proportional change component of the electrostatic capacity for current generated at the sub-drivers 27 is larger.

Therefore, the maximum amplitude of the current waveform in the return period is higher than the maximum amplitude of the current waveform in the drawing period. In view of this, with the optical scanning device pertaining to this embodiment, current generated in the return period is sensed. Consequently, the sensed current value is greater than the current value sensed in the drawing period. The configuration of the current sensor 36 here is the same as in the first embodiment, and current information based on the current sensed in the return period is sent to the malfunction detector 33. In the return period, the current value generated by rotation of the movable frame 23 is sensed, and stoppage (malfunction) of the movable frame 23 is detected. In the return period, the generated current value is higher and the period is shorter, so the amplification ratio must be lowered and the frequency band raised. Accordingly, the second amplifier 365 has a lower amplification ratio than the first amplifier 364.

The method by which the malfunction detector 33 detects stoppage (malfunction) of the movable frame 23 is the same as in the first embodiment. That is, a plurality of (such as 100) sampling points are set within the return period, a current waveform is produced from the current values at these sampling points, and this is compared to a reference current waveform that has been stored in advance. Actually, the current values of the sampling points are compared to the current values obtained from the reference current waveform corresponding to the sampling points. Specifically, the waveform of the sensed current is compared to the reference current waveform. The malfunction detector 33 then detects that the movable frame 23 has stopped (there is a malfunction) if there is a large discrepancy between the waveform of the sensed current and the reference current waveform.

Since the current values are higher in the return period than in the drawing period, the detection accuracy can be raised (for example, the S/N ratio after amplification can be raised). Therefore, when the waveform of the sensed current is compared to the reference current waveform, there will tend to be a difference in the waveform information, and stoppage (malfunction) of the movable frame 23 can be detected more accurately.

Fifth Embodiment

In the fourth embodiment, the waveform of the sensed current was directly compared to the reference current waveform. Instead of directly comparing the waveforms in this way, stoppage (malfunction) of the movable frame 23 can also be detected by comparison of characteristic portions where there are likely to be changes in the waveform of the sensed current due to stoppage (malfunction) of the movable frame 23. In this embodiment, the maximum and minimum values of the current waveform are focused on as characteristic portions.

Figure 21:
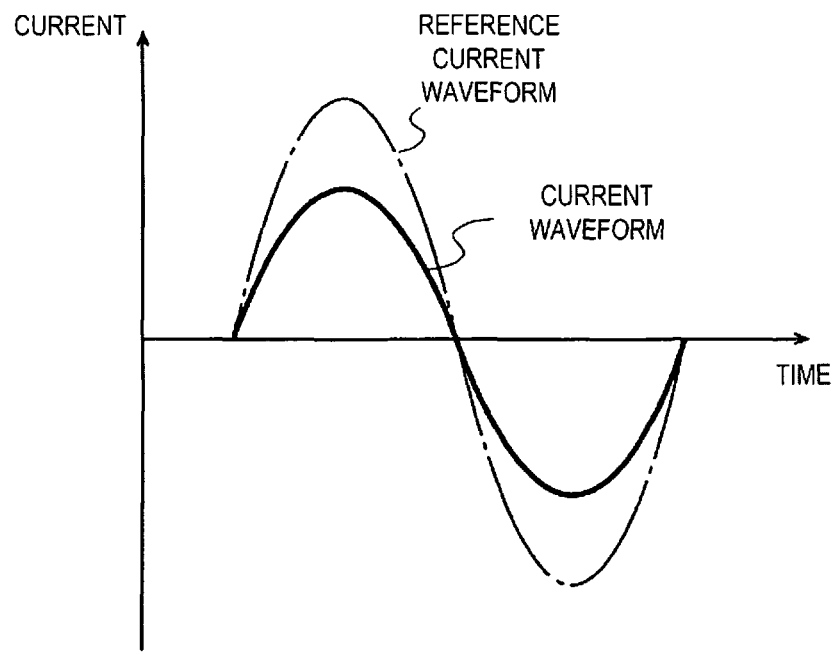
FIG. 21 is a graph of the conditions when stoppage is determined.

The specific method by which the malfunction detector 33 detects stoppage (malfunction) in this embodiment will now be described. FIG. 21 is a graph of the conditions when stoppage is determined. FIG. 21 shows the reference current waveform produced from the current values sensed during normal operation and the waveform of current sensed in the return period. In this embodiment, the return period is predetermined, and if the operation of the movable frame 23 is the same as normal operation, then the waveform of the sensed current will also be a sine wave having a maximum value and a minimum value.

The behavior that appears in the current waveform when the movable frame 23 has stopped is the same as the waveform of the current sensed in the drawing period. That is, when the movable frame 23 stops near the neutral position of the rotational range, there is less vibration, and when it stops at an inclined position, there is a decrease in the absolute value of either the maximum value or the minimum value. Also, if the configuration is such that the rotational speed varies, there will be situations in which the current waveform moves up and down. Since the sensed current value is higher than in the drawing period, the change in the current waveform will be greater than that of the current waveform in the drawing period.

When the malfunction detector 33 utilizes these current waveform characteristics to compare the waveform of the sensed current to the reference current waveform, stoppage (malfunction) of the movable frame 23 is determined to have occurred by comparing the maximum values and the minimum values. More specifically, it is determined as follows. The malfunction detector 33 finds the maximum value and minimum value from the waveform of current sensed at a plurality of sampling points. The malfunction detector 33 then acquires the maximum value and minimum value for the reference current waveform. The malfunction detector 33 finds the difference between the maximum values and minimum values for the sensed current waveform and the reference current waveform, and detects stoppage (malfunction) of the movable frame 23 if this difference goes beyond a specific range.

There is variance in the sensed current values due to circuit malfunction, malfunction caused by changes in the optical scanning element 20, malfunction due to the surrounding environment, and so forth, so the malfunction detector 33 determines the movable frame 23 to have stopped (malfunction to have occurred) when the difference between the maximum values and the difference between the minimum values go beyond a specific range.

As discussed above, the current values generated at the sub-drivers 27 during rotation of the movable frame 23 in the return period are higher than those in the drawing period, so the current values are detected more accurately. Because of this, it is possible to improve the accuracy of detection of the stoppage (malfunction) of the movable frame 23, that is, to reduce erroneous detection in which it is determined that the movable frame 23 has stopped (that a malfunction has occurred) when it has not in fact stopped (when no malfunction has occurred). Consequently, it is less likely that the video will be interrupted due to erroneous detection, so the viewer is less apt to notice anything amiss.

Also, when current in the return period is sensed and stoppage (malfunction) of the movable frame 23 is detected based on this current information, the characteristic portions of the current values (maximum values and minimum values) can be easily set. Also, comparison needs to be performed at only two points, so comparison processing is reduced. Consequently, stoppage (malfunction) can be accurately detected, and detection will take less time after the stoppage of the movable frame 23 (occurrence of a malfunction).

The other features are the same as in the first to fourth embodiments.

Sixth Embodiment

Yet another example of the optical scanning device pertaining to the present invention will be described through reference to the drawings. With the optical scanning device in this embodiment, a malfunction detector 39 is used in place of the malfunction detector 33, but otherwise the configuration is the same as that of the optical scanning device in the fourth embodiment (first embodiment). Therefore, nothing other than the malfunction detector 39 will be described in detail here.

With the optical scanning device in the fourth embodiment, the malfunction detector 33 that acquired the current information binarized (digitized) the current values obtained from the current information with an A/D converter (not shown). Thus using an A/D converter makes the circuit configuration more complicated, and also the processing often takes a long time.

Figure 22:
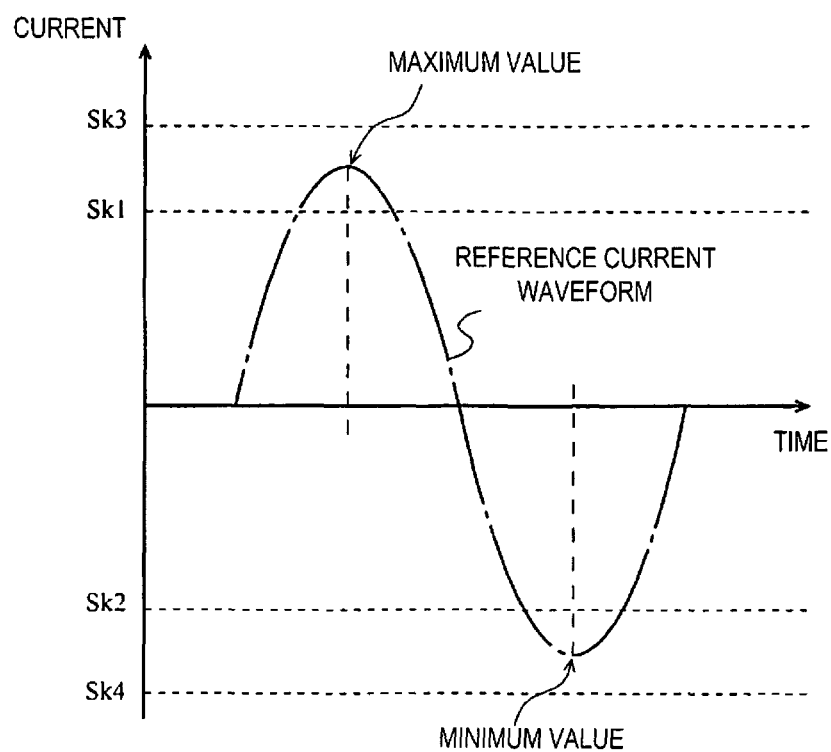
FIG. 22 is a graph of the reference current waveform.

In view of this, the malfunction detector 39 in this embodiment performs malfunction detection by binarizing the current values. The method employed by the malfunction detector 39 for malfunction detection will be described through reference to the drawings. FIG. 22 is a graph of the reference current waveform. As shown in FIG. 22, the maximum value of the reference current waveform is between a first threshold Sk1 and a third threshold Sk3, while the minimum value is between a second threshold Sk2 and a fourth threshold Sk4.

The malfunction detector 39 detects no malfunction, that is, determines the operating state to be normal, when the maximum value based on the current information from the current sensor 36 is between the first threshold Sk1 and the third threshold Sk3, and the minimum value is between the second threshold Sk2 and the fourth threshold Sk4. These thresholds permit error in the optical scanning device, and these thresholds can be suitably determine, and the current values binarized using the thresholds, to detect malfunction of the movable frame 23 simply and accurately. Also, it is possible to vary the type of malfunction (stoppage, offset rotation, etc.) by varying the thresholds.

Figure 23:
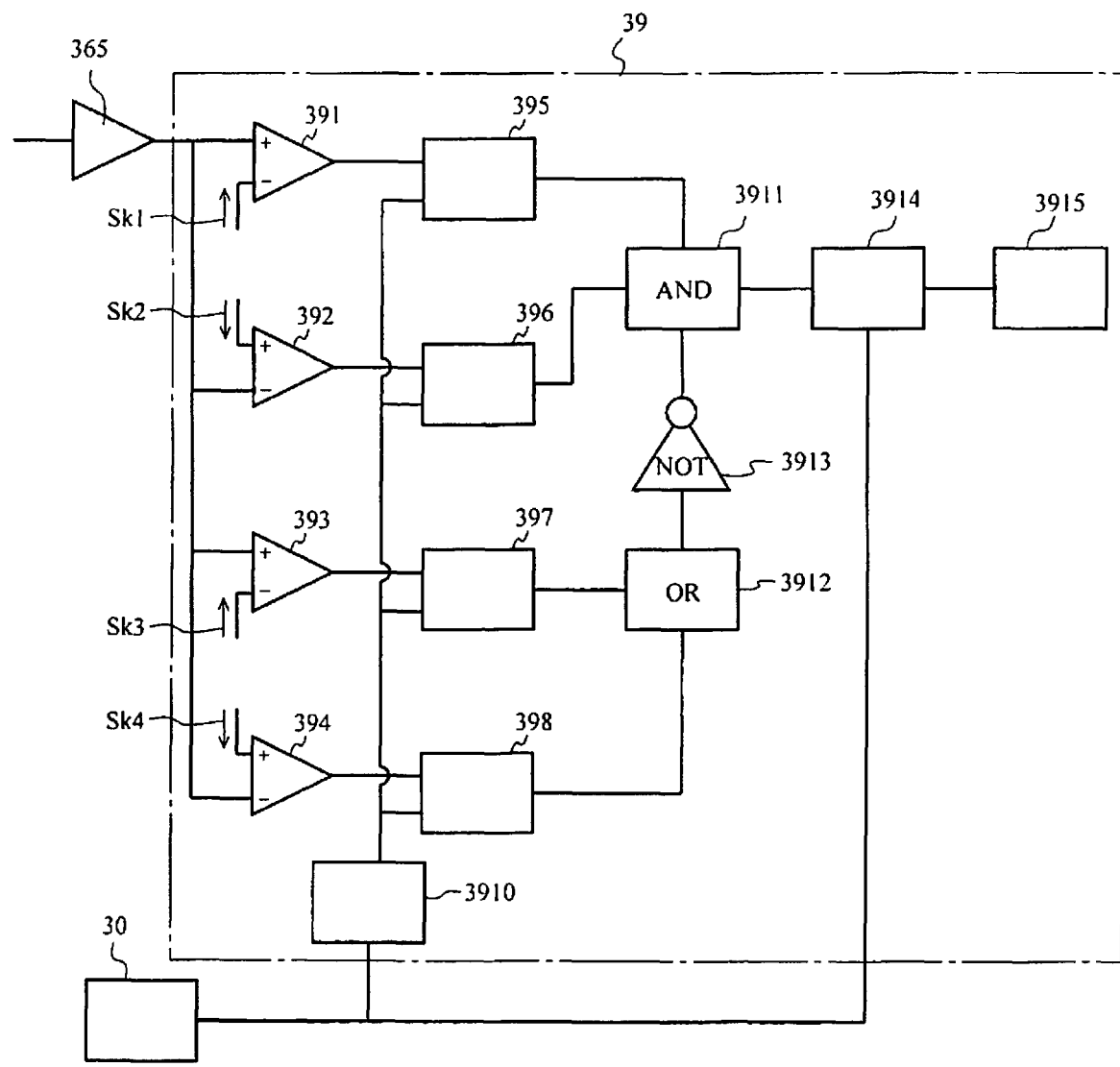
FIG. 23 is a block diagram of a logic circuit of a malfunction detector used in the optical scanning device pertaining to the present invention.

The malfunction detector 39 in this embodiment will now be described in detail. FIG. 23 is a block diagram of a logic circuit of a malfunction detector used in the optical scanning device pertaining to the present invention. As shown in FIG. 23, the malfunction detector 39 comprises the following configurations. In particular, the malfunction detector 39 comprises first to fourth comparison circuits 391 to 394, first to fourth holding circuits 395 to 398, a reset signal production circuit 3910, an AND circuit 3911, an OR circuit 3912, a NOT circuit 3913, a holding circuit 3914, and a determination circuit 3915.

The malfunction detector 39 is configured so that the first to fourth comparison circuits 391 to 394 are disposed to allow for the input of voltage signals corresponding to the current values amplified by the second amplifier 365 of the current sensor 36. As discussed above, the actual input signal is a voltage signal, but since this voltage signal indicates the sensed current value, for the sake of convenience in the following description, we will describe a comparison with current values. A different threshold is set for each of the comparison circuits. Specifically, the first threshold Sk1 is set for the first comparison circuit 391, the second threshold Sk2 for the second comparison circuit 392, the third threshold Sk3 for the third comparison circuit 393, and the fourth threshold Sk4 for the fourth comparison circuit 394.

The first comparison circuit 391 and the third comparison circuit 393 have a high (H) output when the current values are respectively greater than the first threshold Sk1 and the third threshold Sk3. The second comparison circuit 392 and the fourth comparison circuit 394 have a high (H) output when the current values are respectively greater than the second threshold Sk2 and the fourth threshold Sk4. Specifically, the first comparison circuit 391 and the third comparison circuit 393 define the range of the maximum value, while the second comparison circuit 392 and the fourth comparison circuit 394 define the range of the minimum value.

The outputs of the first to fourth comparison circuits 391 to 394 are inputted to the first to fourth holding circuits 395 to 398, respectively. When the reset signal production circuit 3910 is connected to the first to fourth holding circuits 395 to 398 and temporarily there is an H input, with the high output continuing (the output is maintained) until a reset signal is inputted from the reset signal production circuit 3910.

The first comparison circuit 391 goes to high output when the maximum value is greater than the first threshold Sk1, and the first holding circuit 395 holds the high output. The second comparison circuit 392 goes to high output when the minimum value is less than the second threshold Sk2, and the second holding circuit 396 holds the high output. If a malfunction in the movable frame 23 occurs when a malfunction has been determined to have occurred in the movable frame 23 as above, the maximum value will be less than the first threshold Sk1, or the minimum value will be greater than the second threshold Sk2.

Specifically, if no malfunction has occurred at the movable frame 23, the maximum value will be greater than the first threshold, and the minimum value will be less than the second threshold Sk2. Because of this, in order to determine that no malfunction has occurred at the movable frame 23, the logical product of the output of the first holding circuit 395 and the second holding circuit 396 must have a high output. Therefore, the output of the first holding circuit 395 and the output of the second holding circuit 396 are inputted to the AND circuit 3911.

The third comparison circuit 393 goes to high output when the maximum value is greater than the third threshold Sk3, and the third holding circuit 397 holds the high output. The fourth comparison circuit 394 goes to high output when the minimum value is less than the fourth threshold Sk4, and the fourth holding circuit 398 holds the high output. With the above-mentioned condition for determining the stoppage of the movable frame 23, if the movable frame 23 stops, the maximum value will be greater than the third threshold, or the minimum value will be less than the fourth threshold. Because of this, the output of the third holding circuit 397 and the output of the fourth holding circuit 398 are inputted to the OR circuit 3912. The OR circuit 3912 is at a high output when either the third holding circuit 397 or the fourth holding circuit 398 is at a high output.

As discussed above, since the OR circuit 3912 is at a high output when either the third comparison circuit 393 or the fourth comparison circuit 394 is at a high output, the OR circuit 3912 when a malfunction has occurred at the movable frame 23 is at a high output. The AND circuit 3911 must have an input H from the first holding circuit 395 and the second holding circuit 396 when no malfunction has occurred at the movable frame 23, and the output of the OR circuit 3912 is inverted by the NOT circuit 3913, and inputted to the AND circuit 3911.

That is, the outputs of the first holding circuit 395, the second holding circuit 396, and the NOT circuit 3913 are inputted to the AND circuit 3911. The output of the AND circuit 3911 is inputted to the holding circuit 3914. To the holding circuit 3914 is inputted a frame synchronization signal from the synchronizer 30 (synchronization signal production component). The frame synchronization signal is H in the drawing period and L in the return period. The holding circuit 3914 then outputs the current input when the frame synchronization signal is H, maintains the last value when the frame synchronization signal is L, and passes on the result to the determination circuit 3915.

Although this will be discussed in detail below, the holding circuit 3914 has a high output when no malfunction has occurred at the movable frame 23, and has a low output when a malfunction has occurred at the movable frame 23. Therefore, the determination circuit 3915 determines that no malfunction has occurred at the movable frame 23 when the holding circuit 3914 has a high output, and determines that a malfunction has occurred at the movable frame 23 when the output is L. When the determination circuit 3915 determines that a malfunction has occurred at the movable frame 23, stop information indicating that a malfunction has occurred at the movable frame 23 is sent to the light source controller 311. The malfunction occurrence information may be a binary signal of high or low.

Figure 24:
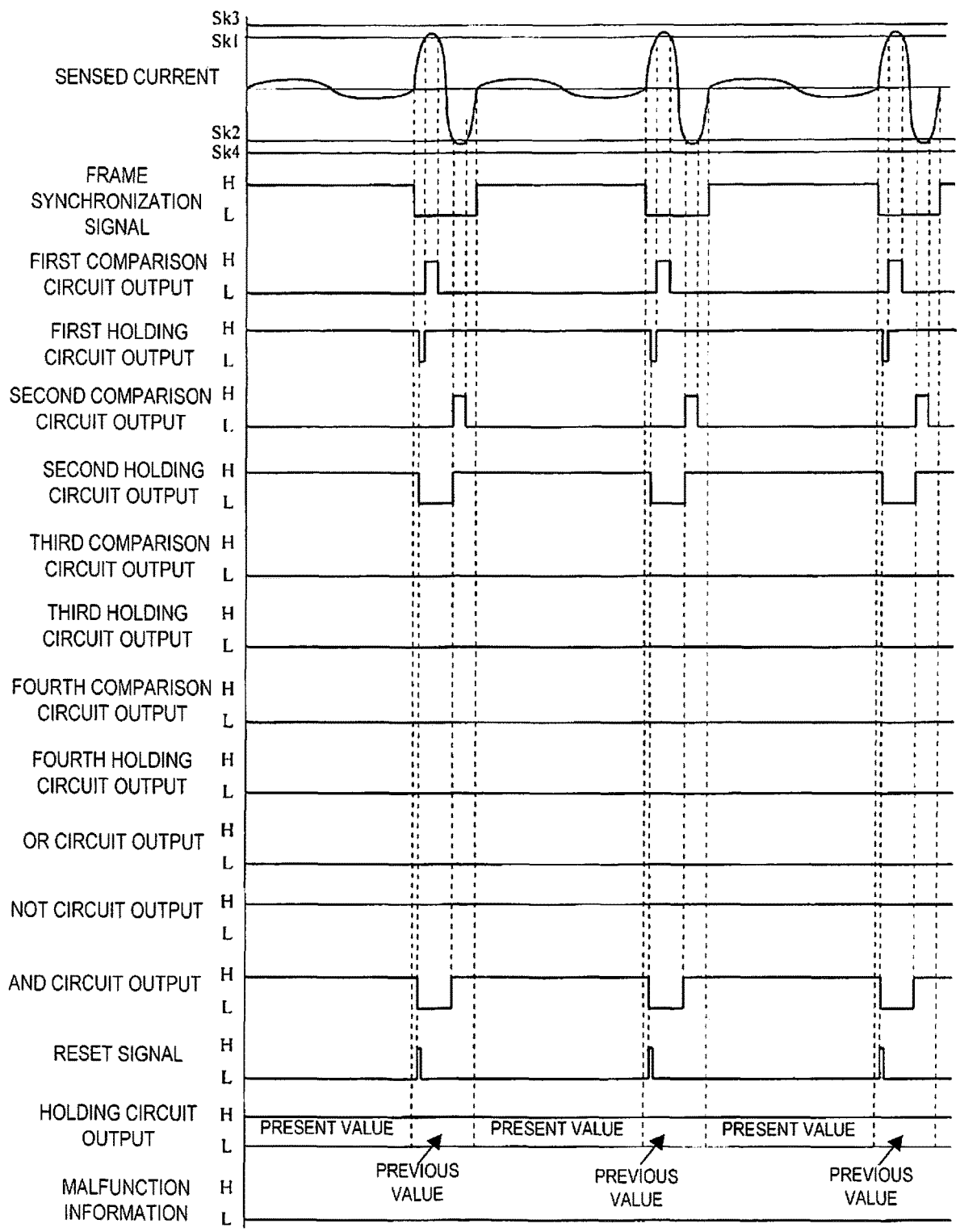
FIG. 24 is a timing chart showing the signals when no malfunction has occurred in the movable frame.

Next, the operation of the malfunction detector 39 will be described through reference to another drawing. FIG. 24 is a timing chart showing the signals when no malfunction has occurred at the movable frame 23. The top of FIG. 24 shows the waveform of sensed current. Then are shown, starting at the top, the outputs of the first comparison circuit 391, the first holding circuit 395, the second comparison circuit 392, the second holding circuit 396, the third comparison circuit 393, the third holding circuit 397, the fourth comparison circuit 394, and the fourth holding circuit 398. Under these are shown the outputs of the OR circuit 3912, the NOT circuit 3913, and the AND circuit 3911. Below these are shown the outputs of the frame synchronization signal, the reset signal, and the output of the holding circuit 3914. The malfunction occurrence information is shown as a binary value (a high output when a malfunction has occurred at the movable frame 23, and a low output when no malfunction has occurred at the movable frame 23).

The malfunction detector 39 in this embodiment does not detect current values in the drawing period. Therefore, the first to fourth comparison circuits 391 to 394 have a low output. In the drawing period the frame synchronization signal is H. Once the return period is entered, the frame synchronization signal changes to L, and the detection of current values, that is, the input of current information, is begun.

Since the current value is not greater than the third threshold Sk3, the third comparison circuit 393 has a low output, and the third holding circuit 397 has a low output. Similarly, since the current value is less than the fourth threshold Sk4, the fourth comparison circuit 394 has a low output. Therefore, the third holding circuit 397 and the fourth holding circuit 398 still have a low output, so the OR circuit 3912 has a low output, and the NOT circuit 3913 inputs an inverted high output to the AND circuit. Specifically, the NOT circuit 3913 has a low output when the sensed current value is greater than the third threshold Sk3 or less than the fourth threshold Sk4.

Once a specific amount of time elapses, the sensed current value exceeds the first threshold Sk1 (see FIG. 22). At this point, the first comparison circuit 391 has a high output and sends it to the first holding circuit 395, and the first holding circuit 395 maintains a high output. When the various holding circuits have been reset with a reset signal, the output is assumed to be low. The reset signal will be discussed below.

After reaching the maximum value, the current value is reduced to less than the first threshold Sk1. At this point the first comparison circuit 391 has a low output, but since the output of the first holding circuit 395 is maintained, the output is high.

As shown in FIG. 22, the current value decreases over time, and at a certain point the current value drops below the second threshold Sk2. At this point, the second comparison circuit 392 sends a high signal to the second holding circuit 396, and the second holding circuit 396 maintains a high output. After reaching the minimum value, the current value is increased to be greater than the second threshold Sk2. At this point, the second comparison circuit 392 has a low output, but the second holding circuit 396 maintains a high output.

In the state shown in FIG. 24, the NOT circuit 3913 has a high output in the return period, and the AND circuit 3911, which is the logical product of the output of the first comparison circuit 391, the output of the second comparison circuit 392, and the output of the NOT circuit 3913, has a high output. Accordingly, after the second comparison circuit 392 goes to a high output, that is, after it has been confirmed that the minimum value is less than the second threshold Sk2, the holding circuit 3914 maintains a high output. Consequently, the determination circuit 3915 determines that no malfunction has occurred at the movable frame 23.

Also, in the example shown in FIG. 24, the maximum value of the current waveform is less than the third threshold Sk3, and the minimum value is greater than the fourth threshold Sk4. The third comparison circuit 393 and the fourth comparison circuit 394 do not go to a high output, and the holding circuit 3914 does not go to a low output.

In this embodiment, the current values are sensed in the return period, and the AND circuit 3911 has a high output in between return periods. The signal inputted to the AND circuit 3911 is maintained once the return period ends. That is, the output of the AND circuit 3911 is not inverted in the drawing period. At the holding circuit 3914, the input signal is outputted directly as an output signal in the drawing period, and the AND circuit 3911 has a high output. The output of the holding circuit 3914 in the return period is held at the previous value, so a high output is maintained in a state in which the high output is maintained in the drawing period.

As discussed above, when no malfunction has occurred at the movable frame 23, the malfunction detector 39 can determine that no malfunction has occurred at the movable frame 23. The reset signal resets the first to fourth holding circuits 395 to 398 to create a state that is ready for the next sensing of the current values. Since the holding circuit 3914 has the characteristic of maintaining the previous value in the return period, if the first to fourth holding circuits 395 to 398 are reset immediately after the switch to the return period, the AND circuit 3911 may end up having a low output, and the previous value cannot be maintained. In order to maintain this previous value, the reset signal is outputted in pulse form once a specific amount of time has elapsed immediately after the frame synchronization signal changes from high to low.

Figure 25:
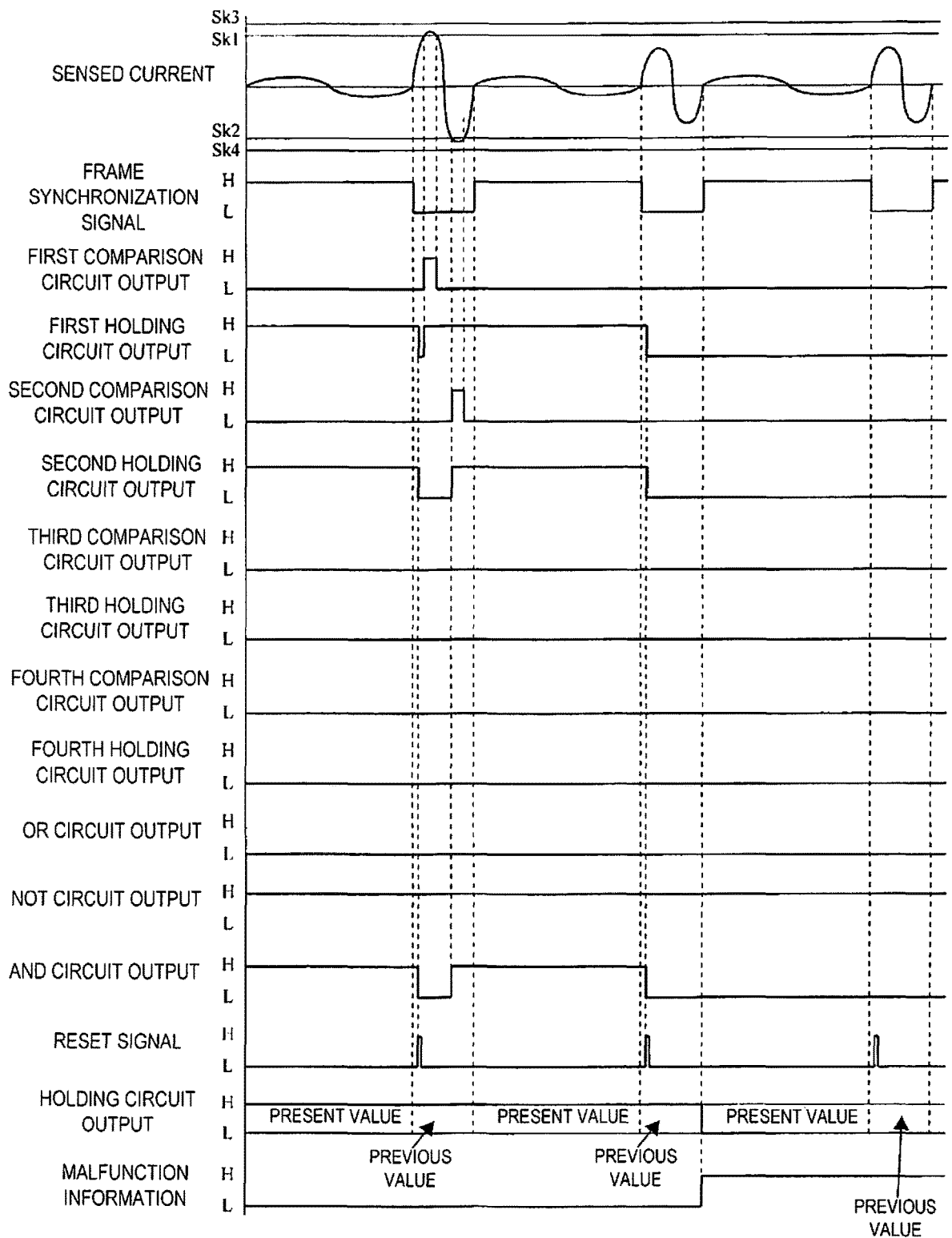
FIG. 25 is a timing chart showing malfunction detection in the movable frame when the maximum value is below a first threshold or when the minimum value is above a second threshold.

Next, the detection of a malfunction of the movable frame 23 will be described. FIG. 25 is a timing chart showing malfunction detection in the movable frame when the maximum value is below the first threshold and the minimum value is above the second threshold. In FIG. 25, the stoppage of the movable frame 23 is being detected in the second of the three frames that are displayed. As shown in FIG. 25, the first frame is the same as in FIG. 24, with no malfunction occurring at the movable frame 23. In the second frame, the maximum value of the current waveform has not gone over the first threshold Sk1, the first comparison circuit 391 has not gone to a high output by the end of the return period, and the first holding circuit 395 maintains a high output after the end of the return period in the second frame.

Similarly, since the minimum value does not drop below the second threshold Sk2, the second comparison circuit 392 does not go to a high output by the end of the return period, and the second holding circuit 396 maintains a low output after the end of the return period in the third frame. Therefore, at the end of the return period in the third frame, at least one input of the AND circuit 3911 will be a low input, and the AND circuit 3911 will go to a low output. If the AND circuit 3911 has a low output at the end of the return period, the holding circuit 3914, which outputs the present input in the drawing period, will go to a low output, and the determination circuit 3915 will determine that a malfunction has occurred at the movable frame 23.

What is described here is when the maximum value is less than the first threshold Sk1 and the minimum value is greater than the second threshold Sk2, but this is not the only option. For example, either the first comparison circuit 391 or the second comparison circuit 392 will go to a low output if either of the conditions is met in which the maximum value is less than the first threshold Sk1 or the minimum value is greater than the second threshold Sk2, so the holding circuit 3914 will go to a low output.

Specifically, after behavior is detected in which it is determined that a malfunction has occurred at the movable frame 23 in the return period (the maximum value is less than the first threshold Sk1 or the minimum value is greater than the second threshold Sk2), the holding circuit 3914 goes to a low output as the return period ends. Accordingly, the malfunction detector 39 detects the stoppage of the movable frame 23 immediately after the end of the return period, and sends stop information to the light source controller 311.

Figure 26:
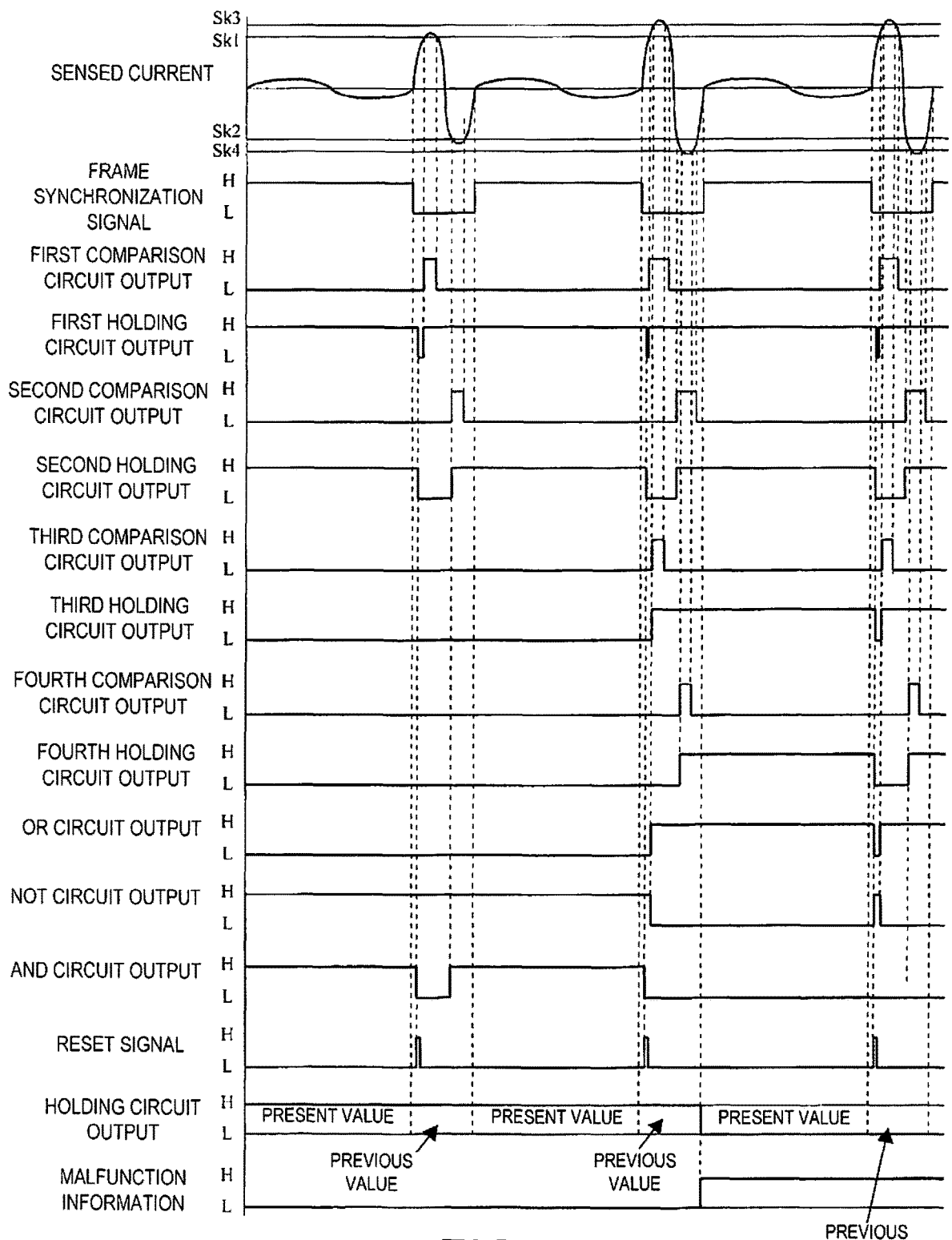
FIG. 26 is a timing chart showing malfunction detection in the movable frame when the maximum value is above a third threshold or when the minimum value is below a fourth threshold.

Another behavior of the current waveform when a malfunction has occurred at the movable frame 23 is when the maximum value is greater than the third threshold Sk3 and the minimum value is less than the fourth threshold Sk4. The operation of the malfunction detector 39 in such a situation will be described through reference to the drawings. FIG. 26 is a timing chart showing malfunction detection in the movable frame 23 when the maximum value is above the third threshold or when the minimum value is below the fourth threshold.

FIG. 26 is similar to FIG. 25 in that a malfunction of the movable frame 23 has occurred after the end of the last of the three frames that are displayed. As shown in FIG. 26, the first two frames are the same as in FIG. 24 in that no malfunction has been detected at the movable frame 23. In the third frame, when the maximum value of the current waveform goes over the third threshold Sk3, the third comparison circuit 393 goes to a high output. The third holding circuit 397 then maintains a high output. Also, in the third frame, when the maximum value of the current waveform drops below the fourth threshold Sk4, the fourth comparison circuit 394 maintains a high output. The fourth holding circuit 398 then maintains a high output.

The third holding circuit 397 and the fourth holding circuit 398 are inputted to the OR circuit 3912, and if either one has a high output, the OR circuit 3912 goes to a high output, which is inverted at the NOT circuit 3913 and inputted to the AND circuit 3911. Accordingly, when the third comparison circuit 393 goes to a high output or the fourth comparison circuit 394 goes to a high output, the NOT circuit 3913 goes to a low output, and the AND circuit 3911 goes to a low output. Then, even when the return period ends, the third holding circuit 397 maintains a high output and/or the fourth holding circuit 398 maintains a high output, so the AND circuit 3911 also goes to a low output.

Therefore, at the end of the return period in the third frame, at least one input of the AND circuit 3911 goes to a low input, so the AND circuit 3911 goes to a low output. If the AND circuit 3911 has a low output at the end of the return period, the holding circuit 3914 that outputs the present input in the drawing period will go to a low output, and the determination circuit 3915 will determine that a malfunction has occurred at the movable frame 23.

Here, a state is described in which the maximum value is greater than the third threshold Sk3 and the minimum value is less than the fourth threshold Sk4, but this is not the only option. For example, either the third comparison circuit 393 or the fourth comparison circuit 394 will go to a low output if either of the conditions is met in which the maximum value is greater than the third threshold Sk3 or the minimum value is less than the fourth threshold Sk4, so the holding circuit 3914 will go to a low output.

Specifically, after behavior is detected in which it is determined that a malfunction has occurred at the movable frame 23 in the return period (the maximum value is greater than the third threshold Sk3 or the minimum value is less than the fourth threshold Sk4), the holding circuit 3914 goes to a low output as the return period ends. Accordingly, the malfunction detector 39 detects the occurrence of a malfunction at the movable frame 23 immediately after the end of the return period, and sends malfunction occurrence information to the light source controller 311.

Since the use of the malfunction detector 39 as in this embodiment means that no A/D converter is used for digitizing the current values, the configuration is simpler. Also, since the current information is binarized for processing, the processing is simple and the occurrence of a malfunction at the movable frame 23 can be detected accurately and in a short time.

The rest of the features are the same as in the fourth and fifth embodiments.

Thus, in the illustrated embodiment, the controller 31 reduces the emission of the light beam from the light source component 100 when the maximum value of the current waveform (e.g., sensed current) is below the first threshold Sk1, or when the minimum value of the current waveform (e.g., sensed current) is above the second threshold Sk2 that is below the first threshold Sk1. Also, in the illustrated embodiment, the controller 31 reduces the emission of the light beam from the light source component 100 when the maximum value of the current waveform (e.g., sensed current) is above the third threshold Sk3 that is above the first threshold Sk1, or when the minimum value of the current waveform (e.g., sensed current) is below the fourth threshold Sk4 that is below the second threshold Sk2.

Seventh Embodiment

In the fourth and fifth embodiments, stoppage was detected from a change in amplitude, focusing on the maximum and minimum current values in a change in the current waveform, that is, on a change in the amplitude. When a malfunction occurs at the movable frame 23, there is a change not only in amplitude, but also in phase, and it is also possible to detect the occurrence of malfunction at the movable frame 23 by detecting a change in phase. The detection of malfunction at the movable frame 23 in the optical scanning device pertaining to this embodiment will now be described.

Figure 27:
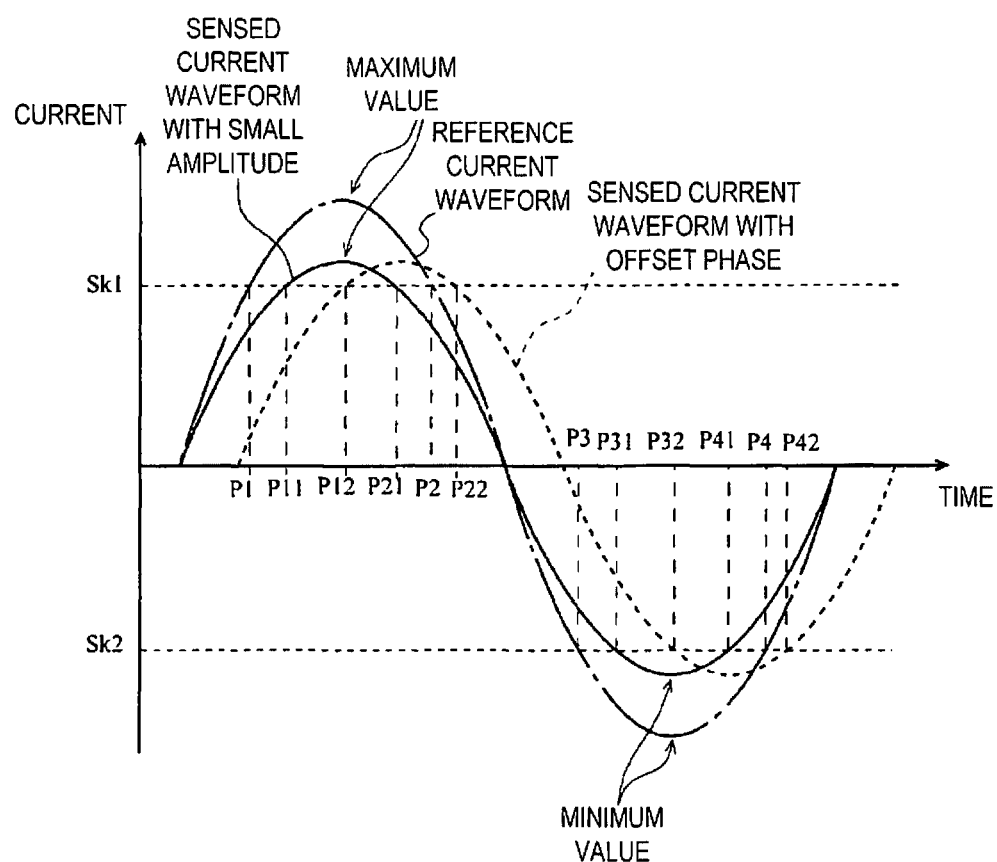
FIG. 27 is a graph of the current waveform when performing malfunction detection in the optical scanning device pertaining to the present invention.

FIG. 27 is a graph of the current waveform when performing malfunction detection in the optical scanning device pertaining to the present invention. FIG. 27 shows the reference current waveform and the waveform of current sensed when a malfunction has occurred at the movable frame 23. The solid line shows the current waveform in an example in which the amplitude has changed, and the broken line shows the current waveform in an example in which the amplitude and phase have changed.

In FIG. 27, there is a first threshold Sk1 that is less than the maximum value, and a second threshold Sk2 that is greater than the minimum value. The first threshold Sk1 and the second threshold Sk2 are the same values as the first threshold Sk1 and second threshold Sk2 shown in FIG. 22.

As shown in FIG. 27, we will let a first point P1 be the point where the reference current waveform first intersects the first threshold Sk1, a second point P2 be the point where the next intersection occurs, a third point P3 be the point where the first intersection with the second threshold Sk2 occurs, and a fourth point P4 be the point where the next intersection occurs.

If the waveform of the sensed current has a smaller amplitude than the reference current waveform, then the time between the first point P11 and the second point P21 will be shorter, and the time between the third point P31 and the fourth point P41 will also be shorter. Also, the position of the first point P11 will be later within the return period compared to the first point P1 of the reference current waveform. Also, the time between the first point and the second point, and the time between the third point and the fourth point will vary when either the maximum value or the minimum value increases or decreases.

Thus, in the illustrated embodiment, the controller 31 compares the waveform of the sensed current with the reference current waveform based on the difference between the length of time (from P11 to P21) during which the value of the waveform of the sensed current is beyond the first threshold Sk1 (e.g., predetermined threshold value) and the length of time (from P1 to P2) during which the value of the reference current waveform is beyond the first threshold Sk1. Also, the controller 31 compares the waveform of the sensed current with the reference current waveform based on the difference between the length of time (from P31 to P41) during which the value of the waveform of the sensed current is beyond the second threshold Sk2 (e.g., predetermined threshold value) and the length of time (from P3 to P4) during which the value of the reference current waveform is beyond the first threshold Sk2. In the illustrated embodiment, the controller 31 reduces the emission of the light beam from the light source component 100 when the difference is greater than a predetermined length of time.

The waveform of the sensed current can also become offset in the time direction (offset phase). A current waveform with an offset phase is indicated by a dotted line in FIG. 27. In such a case, the offset in the time direction is such that the above-mentioned first point P11 goes to the first point P12, the second point P21 to the second point P22, the third point P31 to the third point P32, and the fourth point P41 to the fourth point P42. That is, a change in amplitude and an offset in phase can be detected by detecting the first to fourth points. Thus, in the illustrated embodiment, the controller 31 compares the phase of the waveform of the sensed current with the phase of the reference current waveform, and controls the emission of the light beam from the light source component 100 according to comparison of the phase of the waveform of the sensed current with the phase of the reference current waveform. Specifically, in the illustrated embodiment, the controller 31 compares the phase of the waveform of the sensed current with the phase of the reference current waveform based on the difference between the timing (P12, P22, P32, P42) when the value of the waveform of the sensed current reaches the first threshold Sk1 or the second threshold Sk2 (e.g., predetermined threshold) and the timing (P1, P2, P3, P4) when the value of the reference current waveform reaches the first threshold Sk1 or the second threshold Sk2. Specifically, in the illustrated embodiment, the controller 31 reduces the emission of the light beam from the light source component 100 when the difference is greater than a predetermined length of time.

Thus, the time can be sensed when the waveform of the sensed current reaches a specific value, and the occurrence of a malfunction at the movable frame 23 can be sensed based on a change with respect to the reference current waveform. Furthermore, since a change in phase can also be detected, and not just in amplitude, details about the malfunction that has occurred at the movable frame 23 (in some cases, the cause) can be acquired. Specifically, the malfunction detector 33 is able to detect a malfunction at the movable frame 23 as well as details about this malfunction by comparing phase information about the waveform of the sensed current to phase information about the reference current waveform.

The method for utilizing this phase information to detect stoppage of the movable frame 23 may involve acquiring phase information from digitized current information and comparing this information, but this tends to entail a great deal of processing.

In view of this, the edge of a pulse waveform obtained by binarizing a reference current waveform with the first threshold Sk1 and the second threshold Sk2 is acquired and stored ahead of time. The waveform of the sensed current is then binarized with the first threshold Sk1 and the second threshold Sk2 and converted into a pulse waveform, and the edge of this pulse waveform is detected. The edge of the pulse waveform of the reference current waveform is then compared to the edge from the waveform of the sensed current, and malfunction at the movable frame 23 is detected from this comparison result.

Since the edges of binarized pulse waveforms are thus detected and compared, it is possible to simplify the processing. Also, since this configuration involves acquiring a change from the phase, there are fewer thresholds, so the circuit configuration can be that much smaller. In particular, the processing speed can be raised over that when an A/D converter is used.

The rest of the features are the same as in the fourth to sixth embodiments.

Eighth Embodiment

Figure 28:
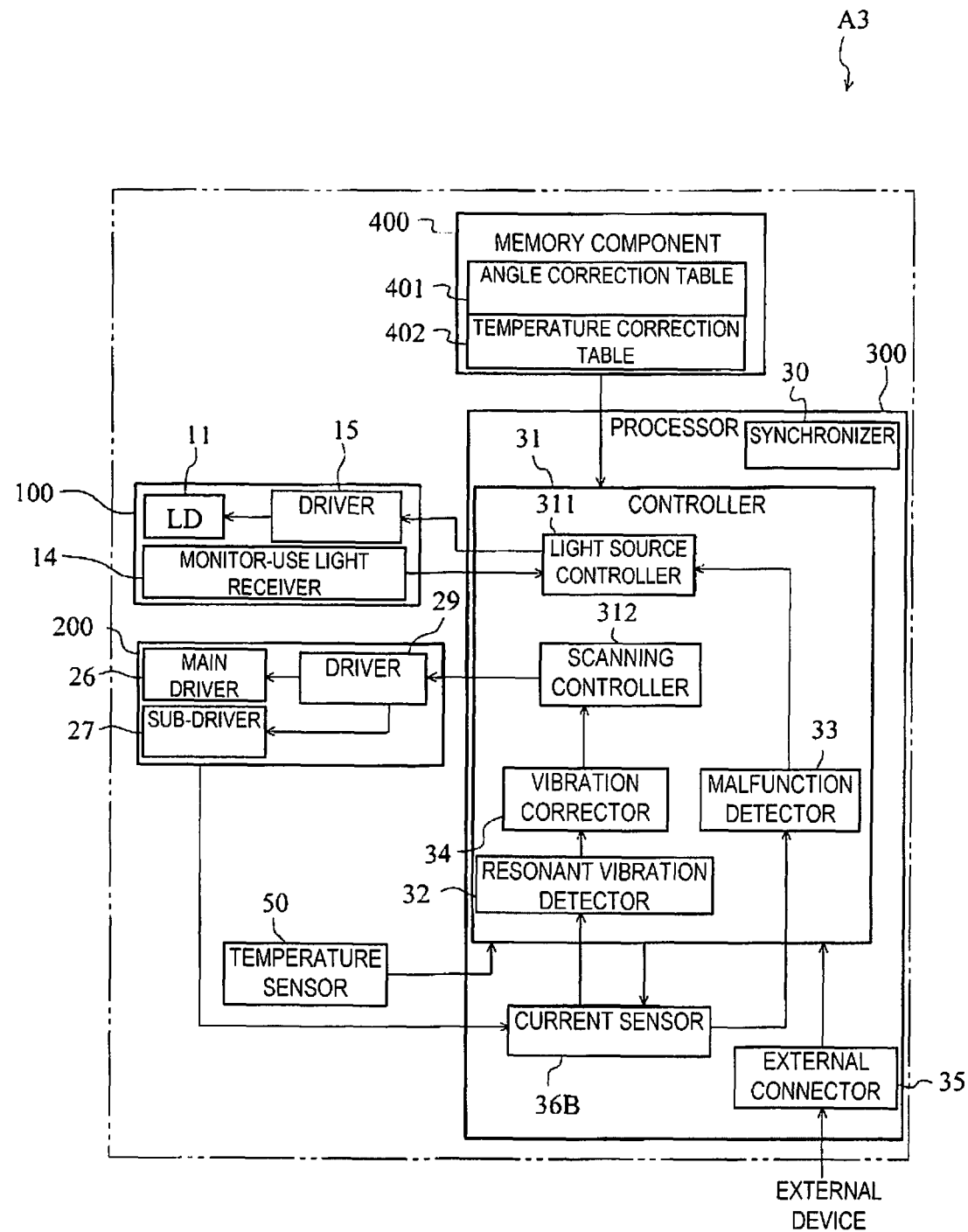
FIG. 28 is a block diagram of the optical scanning device pertaining to the present invention.
Figure 29:
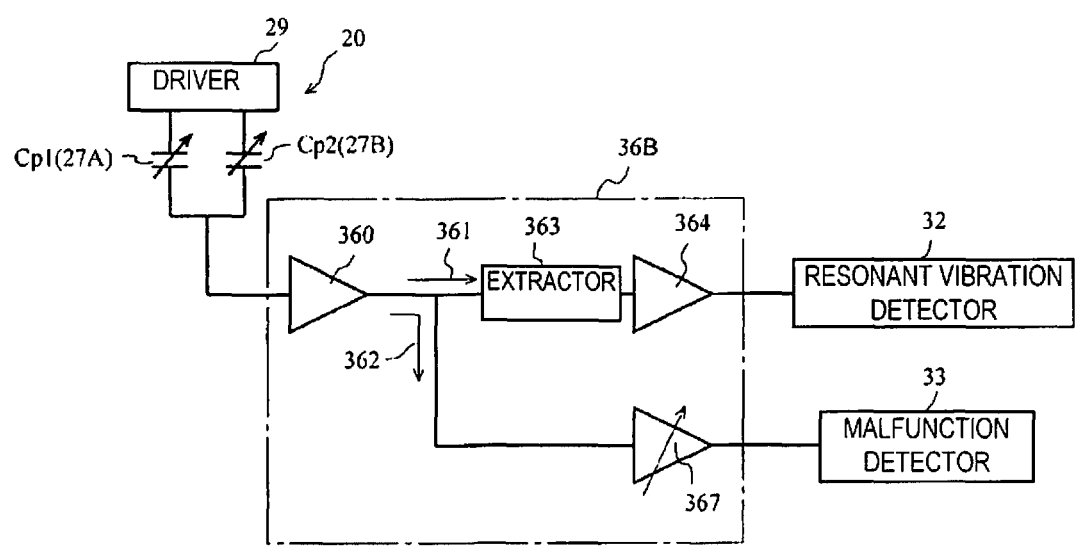
FIG. 29 is a simplified circuit diagram of the current sensor used in the optical scanning device shown in FIG. 28.

Yet another example of the optical scanning device pertaining to the present invention will be described through reference to the drawings. FIG. 28 is a block diagram of the optical scanning device pertaining to the present invention. FIG. 29 is a simplified circuit diagram of the current sensor used in the optical scanning device shown in FIG. 28. The optical scanning device A3 shown in FIG. 28 is the same as the optical scanning device A, except that the processor 300 has a current sensor 36B that comprises a second amplifier 367 with a variable amplification ratio, and a temperature measurement component 50 (e.g., temperature sensor) is provided to measure the temperature. Therefore, those portions of the optical scanning device A3 that are the same as in the optical scanning device A will be numbered the same and will not be described again in detail.

As shown in FIG. 29, with the optical scanning device A3, the current sensor 36B of the processor 300 comprises the second amplifier 367 whose amplification ratio can be changed (that is, it has a variable amplification ratio). The second amplifier 367 is configured so that the amplification ratio can be changed by a control signal from the controller 31.

With the optical scanning device A3 in this embodiment, the current value generated by the rotation of the movable frame 23 in the return period is sensed, and stoppage or other such malfunction is detected. In the return period, the generated current value is high and the period is short, so the amplification ratio must be lowered and the frequency band raised. Also, the amplification ratio is variable in the second amplifier 367 since the generated current value varies with the rotational angle of the movable frame 23.

By using the second amplifier 367 with a variable amplification ratio, even if the rotational angle required by the movable frame 23 changes and there is a change in the current value, the waveform of the sensed current and the reference current waveform can still be compared by setting the amplification ratio according to the change in the rotational angle. For example, an angle correction table 401 that corresponds to the angle of the movable frame 23 and the amplification ratio may be stored ahead of time in the memory component 400, so that the controller 31 calculates the amplification ratio based on the rotational angle of the movable frame 23, and the amplification ratio of the second amplifier 367 is adjusted. Examples of the angle correction table 401 include a table or graph corresponding to the angle and amplification ratio, but these are not the only options. Also, a computational formula for the relation between angle and amplification ratio may be stored instead of or in addition to the angle correction table 401, and this computational formula may be used to calculate the amplification ratio.

Thus changing the amplification ratio makes it easy to compare the waveform of the sensed current to the reference current waveform, and allows the processing load to be reduced correspondingly. This comparison of the waveform of the sensed current to the reference current waveform may be performed by the method in any of the fourth to seventh embodiments, or by some other method.

Also, with the optical scanning device A3 pertaining to the present invention, the processor 300 needs to have high processing capacity. As the processing capacity of the processor 300 rises, more heat is generated during operation. The circuitry of the current sensor 36B is affected by this heat, which changes its characteristics and diminishes its performance, and there will be variance in the current information outputted from the current sensor 36B. Also, the coefficient of elasticity of the first elastic supports 24 may be affected by the heat, and the rotational angle may also be different even though the same drive signal is supplied.

To compensate for this variance caused by heat, such as a change in the circuitry or a change in the physical characteristics of the optical scanning element 20, the temperature around the temperature measurement component 50 is measured. The amplification ratio of the second amplifier 367 is then adjusted by the controller 31 based on the temperature information obtained by the temperature measurement component 50.

The memory component 400 stores, for example, a computational formula or a temperature correction table 402 that associates the rotational angle of the movable frame 23, the sensed temperature, and the amplification ratio. The controller 31 then invokes the temperature correction table 402 from the memory component 400, and calculates the amplification ratio from the sensed temperature and/or the rotational angle. The amplification ratio of the second amplifier 367 is then adjusted based on the calculated amplification ratio. Thus, in the illustrated embodiment, the optical scanning device A3 further comprises the temperature measurement component 50 configured to sense the temperature of the current sensor 36B. Also, in the illustrated embodiment, the second amplifier 367 has the variable amplification ratio that is variably set based on the temperature sensed by the temperature measurement component 50. Also, in the illustrated embodiment, the second amplifier 367 has a variable amplification ratio.

Thus adjusting (correcting) the amplification ratio of the amplifier (the second amplifier 367) used for detecting malfunction of the movable frame 23 allows a change in the sensed current due to the rotational angle of the movable frame 23, or a change in the sensed current due to the ambient temperature, to be corrected, so the occurrence of a malfunction at the movable frame 23 can be detected accurately. Also, since this simple control involves merely correcting the amplification ratio, the amount of processing required is less than when correcting the current value itself.

The rest of the features are the same as in the fourth to seventh embodiments.

Ninth Embodiment

Figure 30:
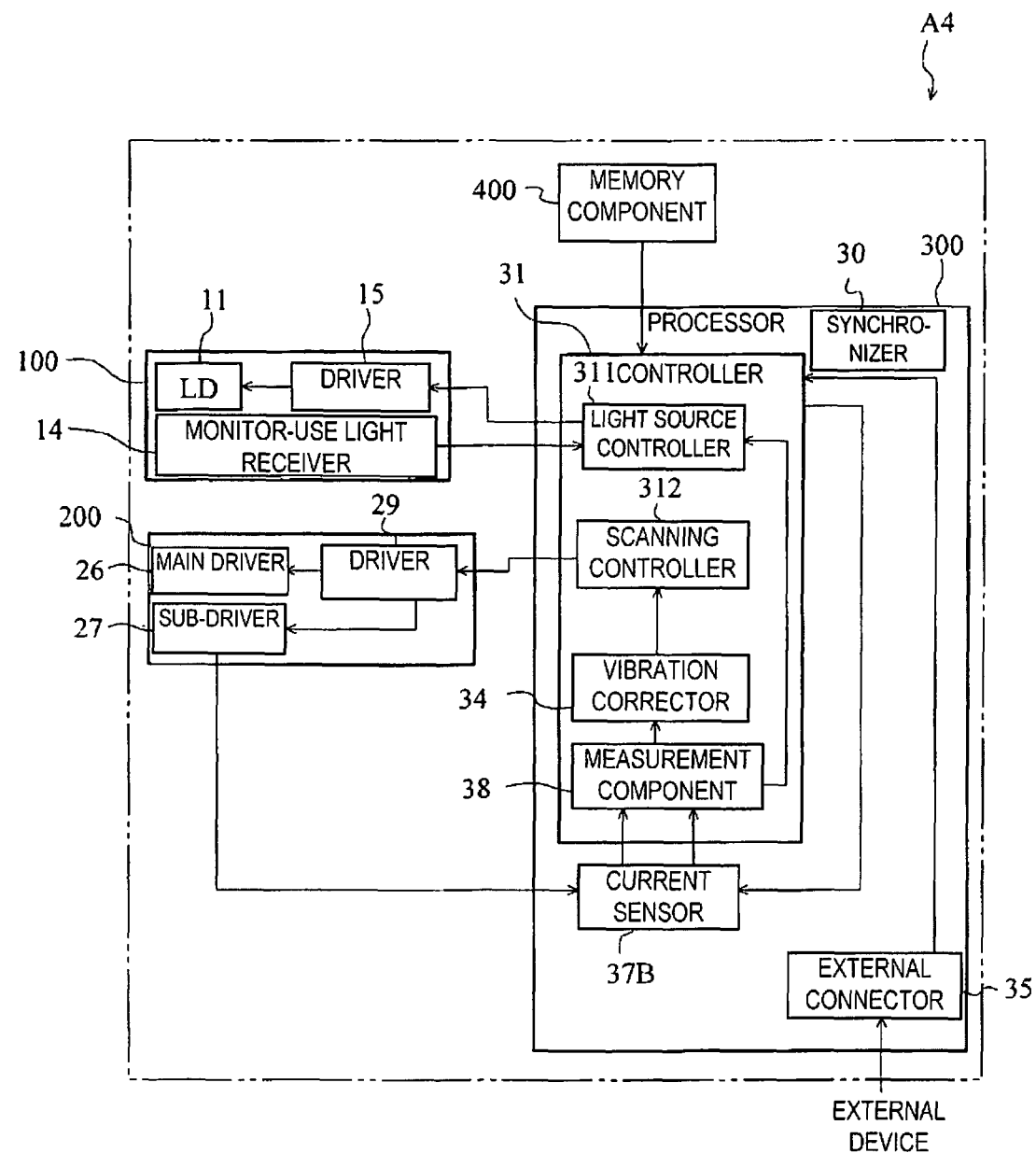
FIG. 30 is a block diagram of another example of the optical scanning device pertaining to the present invention.
Figure 31:
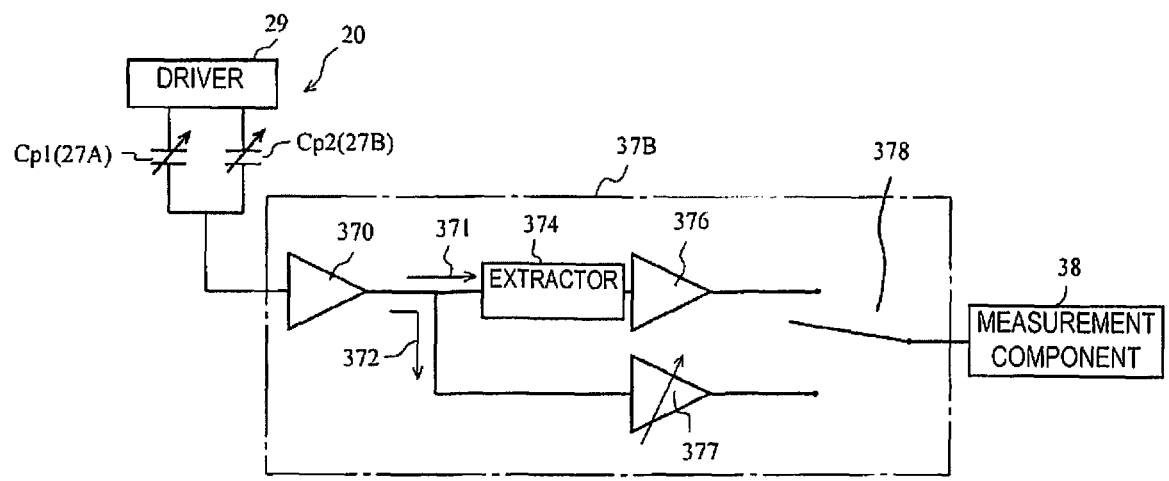
FIG. 31 is a circuit diagram of the current sensor used in the optical scanning device shown in FIG. 30.

Yet another example of the optical scanning device pertaining to the present invention will be described through reference to the drawings. FIG. 30 is a block diagram of another example of the optical scanning device pertaining to the present invention. FIG. 31 is a circuit diagram of the current sensor used in the optical scanning device shown in FIG. 30. As shown in FIG. 30, an optical scanning device A4 is the same as the optical scanning device A2 shown in FIG. 18, except that the current sensor 37B is different. Therefore, those portions of the optical scanning device A4 that are substantially the same as in the optical scanning device A2 will be numbered the same, and these portions that are the same will not be described again in detail.

As shown in FIG. 30, in the processor 300 of the optical scanning device A4, the measurement component 38 acquires the resonant vibration frequency and detects stoppage based on current information from the current sensor 37B.

The current sensor 37B comprises the I/V converter 370, the first path 371, the second path 372, the extractor 374, a first amplifier 376, a second amplifier 377, and a switch 378. The current sensor 37B differs from the current sensor 37 shown in FIG. 19 in that it does not have the switch 373 or the amplifier 375, and the first amplifier 376, the second amplifier 377, and the switch 378 are added. Therefore, those portions that are substantially the same will not be described in detail again.

The output of the I/V converter 370 is connected to both the first path 371 and the second path 372. The first path 371 extracts just the wavelength component of the resonance frequency out of the current information (voltage) inputted at the extractor 374. The extractor 374 is connected to the input of the first amplifier 376.

The second path 372 comprises the second amplifier 377. The voltage inputted to the second path 372 is amplified by the second amplifier 377. The second amplifier 377 is the same as the second amplifier 367 in the eighth embodiment in that its amplification ratio is variable, and the amplification ratio is adjusted based on a control signal from the controller 31.

The switch 378 selectively connects either the first path 371 (the output of the first amplifier 376) or the second path 372 (the output of the second amplifier 377) to the measurement component 38. The switch 378 drives based on a frame synchronization signal from the synchronizer 30. The detection of a malfunction of the movable frame 23 makes use of the current waveform for the return period, so the switch 378 connects to the first path 371 in the drawing period and to the second path 372 in the return period.

The measurement component 38 is the same as the switch 378 in that it acquires information about the return period and the drawing period from a frame synchronization signal, operates as a resonant vibration detector in the drawing period, and operates as a malfunction detector in the return period. The measurement component 38 may perform different processing (resonant vibration detection or malfunction detection) according to the signal that is inputted.

With this configuration, the number of amplifiers can be reduced, which means that the current sensor can be smaller.

The rest of the features are the same as in the embodiments given above.

Embodiments of the present invention were described above, but the present invention is not limited to or by what was given in them. Also, embodiments of the present invention can be variously modified without departing from the gist of the invention. It is also possible to suitably combine the various embodiments given above.

[1] In view of the state of the known technology and in accordance with a first aspect of the present invention, an optical scanning device comprises a light source component, a scanning component, an electrostatic driver, a controller, and a current sensor. The light source component is configured to emit light. The scanning component is configured to scan the light. The driver is configured to drive the scanning component. The controller is configured to control emission of the light from the light source component. The current sensor is configured to sense current generated by a capacity change of the driver. The controller is configured to control the emission of the light from the light source component based on the sensed current sensed by the current sensor.

With this configuration, the scanning component can rotate back and forth at a specific angle around a rotational axis to scan the light, for example. The current sensor can sense the current and output current information according to the sensed current, for example. The controller can control the emission of the light by stopping the emission of the light or by reducing the emission of the light, for example. The current is sensed that is generated at the driver during rotation of the scanning component and that corresponds to the characteristics of rotation of the scanning component. Stoppage or another such malfunction is determined based on this current. Thus, the stoppage of the scanning component or other such malfunctions can be detected even though no sensor or the like is separately attached. The current generated at the driver subtly reacts to and changes with changes in the operation (reciprocal rotation) of the scanning component. Thus, stoppage of the movable frame or other such malfunctions can be precisely detected. Also, this makes it less likely that the light beam will irradiate a single spot, causing the irradiated portion to become hot or be degraded.

Also, the above-mentioned current is generated by the reciprocal rotation of the scanning component, and is influenced by the reciprocal rotation of the scanning component, for example. Thus, even if stoppage or another such malfunction should occur in the scanning component due to a problem with something other than the scanning component, that malfunction in the scanning component can be detected.

[2] In accordance with a preferred embodiment according to the optical scanning device mentioned above, the controller is configured to reduce the emission of the light from the light source component.

[3] In accordance with a preferred embodiment according to any one of the optical scanning devices mentioned above, the controller is configured to compare the sensed current with a predetermined reference current, and is configured to control the emission of the light from the light source component according to comparison of the sensed current with the predetermined reference current.

[4] In accordance with a preferred embodiment according to any one of the optical scanning devices mentioned above, the predetermined reference current indicates current for when the scanning component is being driven normally.

A configuration such as this allows malfunctions to be detected quickly, since stoppage or another such malfunction in the scanning component is detected based on the predetermined reference current that is pre-stored. Also, by setting the predetermined reference current for each optical scanning device, variance in the malfunction detection accuracy due to individual differences can be suppressed.

[5] In accordance with a preferred embodiment according to any one of the optical scanning devices mentioned above, the controller is configured to control the emission of the light from the light source component when a difference between the sensed current and the predetermined reference current exceeds a predetermined range.

For example, the above configuration may also be such that the controller stops the light from the light source component or reduces its output when the maximum and/or minimum value of the waveform of the sensed current has exceeded a predetermined range determined from the predetermined reference current. With this configuration, if a deviation should occur in the rotational range when the scanning component rotates, it can be detected that a malfunction has occurred in the rotation of the scanning component, and the light can be restricted to a safe output. Consequently, the operation of the optical scanning device can be limited not only when the scanning component has stopped, but also when a malfunction has occurred in its rotation.

[6] In accordance with a preferred embodiment according to any one of the optical scanning devices mentioned above, the controller is configured to reduce the emission of the light from the light source component when a maximum value of the sensed current is below a first threshold, or when a minimum value of the sensed current is above a second threshold that is below the first threshold.

For example, the above configuration may also be such that the first threshold is lower than the global maximum value of the predetermined reference current, the second threshold is higher than the global minimum value of the predetermined reference current, and the controller stops the light from the light source component or reduces its output when the maximum value of the sensed current is below the first threshold, or when the minimum value of the sensed current is above the second threshold. With this configuration, deviation in the rotational range of the scanning component or variance in the rotational angle can be accurately detected. This means that the operation of the optical scanning device can be limited when a malfunction has occurred in the scanning component.

[7] In accordance with a preferred embodiment according to any one of the optical scanning devices mentioned above, the controller is configured to reduce the emission of the light from the light source component when the maximum value of the sensed current is above a third threshold that is above the first threshold, or when the minimum value of the sensed current is below a fourth threshold that is below the second threshold.

For example, the above configuration may also be such that the third threshold is above the global maximum value of the predetermined reference current, the fourth threshold is below the global minimum value of the predetermined reference current, and the controller stops the light from the light source component or reduces its output when the maximum value of the sensed current is above the third threshold, or when the minimum value of the sensed current is below the fourth threshold. With this configuration, deviation in the rotational range of the scanning component or variance in the rotational angle can be accurately detected. This means that the operation of the optical scanning device can be limited when a malfunction has occurred in the scanning component.

[8] In accordance with a preferred embodiment according to any one of the optical scanning devices mentioned above, the controller is configured to compare a phase of the sensed current with a phase of the predetermined reference current, and is configured to control the emission of the light from the light source component according to comparison of the phase of the sensed current with the phase of the predetermined reference current.

For example, the above configuration may also be such that the controller controls the light from the light source component by comparing the phase of the waveform of the sensed current with the phase of the predetermined reference current. It can also be detected a case in which the operating range and operating speed of the scanning component are the same as normal, but the phase is offset. Consequently, the occurrence of deviation in the synchronization between the light source component and the scanning component can be quickly detected, and the display of video that is not correct can be halted.

[9] In accordance with a preferred embodiment according to any one of the optical scanning devices mentioned above, the controller is configured to compare the phase of the sensed current with the phase of the predetermined reference current based on a difference between a timing when a value of the sensed current reaches a predetermined threshold and a timing when a value of the predetermined reference current reaches the predetermined threshold.

[10] In accordance with a preferred embodiment according to any one of the optical scanning devices mentioned above, the controller is configured to reduce the emission of the light from the light source component when the difference is greater than a predetermined length of time.

For example, the above configuration may also be such that the controller binarizes the waveform of the sensed current at the predetermined threshold, senses the output time (the timing or the length of time) of the binarized sensed current, compares this with the output time of the predetermined reference current binarized at the same threshold, and stops the light from the light source component or reduces its output if the difference is greater than a predetermined value. With this configuration, processing to digitize the current value can be eliminated when deviation in the phase or an increase/decrease in amplitude is detected for the sensed current with respect to the predetermined reference current. This makes it possible to reduce the processing.

[11] In accordance with a preferred embodiment according to any one of the optical scanning devices mentioned above, the scanning component is configured to scan the light in a scanned region during a drawing period, and is configured to return the light from a scanning end position to a scanning start position during a return period, and the controller is configured to control the emission of the light from the light source component based on the sensed current acquired from the current sensor for either the return period or the drawing period.

For example, the controller acquires from the current sensor the sensed current for either the return period or the drawing period. When sensing of the current is performed during the drawing period, it is possible to acquire an accurate current waveform even at a low sampling frequency since the drawing period is longer. On the other hand, when the sensing of the current is performed during the return period, the amplification ratio during sensing can be reduced since a large amount of current is generated in the return period.

[12] In accordance with a preferred embodiment according to any one of the optical scanning devices mentioned above, the current sensor includes a first path and a second path that is parallel to the first path.

[13] In accordance with a preferred embodiment according to any one of the optical scanning devices mentioned above, the current sensor has an extraction component that is configured to extract a resonance frequency of resonant vibration from the sensed current, and a first amplifier that is configured to amplify an output from the extraction component on the first path.

[14] In accordance with a preferred embodiment according to any one of the optical scanning devices mentioned above, the current sensor has a second amplifier that is configured to amplify the sensed current on the second path.

With this configuration, on the first path, noise other than the resonance frequency can be removed, and resonant vibration can be detected accurately. Also, on the second path, since no noise is removed, a change in the current waveform can be detected a high precision. By detecting vibration on the first path, and detecting malfunction on the second path, sensing of the resonant vibration of the scanning component and detection of malfunction can both be performed very precisely with a single current sensor.

[15] In accordance with a preferred embodiment according to any one of the optical scanning devices mentioned above, the optical scanning device further comprises a temperature sensor configured to sense a temperature of the current sensor. The second amplifier has a variable amplification ratio that is variably set based on the temperature sensed by the temperature sensor. Consequently, variance in the amplification ratio caused by temperature change at the second amplifier can be corrected, and current changes can be accurately detected.

[16] In accordance with a preferred embodiment according to any one of the optical scanning devices mentioned above, the controller is configured to compare values of the sensed current sensed at different timings, and is configured to control the emission of the light from the light source component according to comparison of the values of the sensed current.

[17] In accordance with a preferred embodiment according to any one of the optical scanning devices mentioned above, the controller is configured to compare values of the sensed current and the predetermined reference current at the same timing, and is configured to reduce the emission of the light from the light source component when a difference of the values is greater than a predetermined threshold.

[18] In accordance with a preferred embodiment according to any one of the optical scanning devices mentioned above, the controller is configured to compare the sensed current with the predetermined reference current based on a difference between a length of time during which a value of the sensed current is beyond a predetermined threshold value and a length of time during which a value of the predetermined reference current is beyond the predetermined threshold.

[19] In accordance with a preferred embodiment according to any one of the optical scanning devices mentioned above, the controller is configured to reduce the emission of the light from the light source component when the difference is greater than a predetermined length of time.

[20] In accordance with a preferred embodiment according to any one of the optical scanning devices mentioned above, the second amplifier has a variable amplification ratio.

The present invention provides an optical scanning device with which stoppage or locked state of the scanning component and other such malfunctions can be accurately detected, which suppresses accidents that happen when the irradiation location of a light beam is fixed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An optical scanning device comprising:
a light source component that emits light;
a scanning component that scans the light;
an electrostatic driver that drives the scanning component, the electrostatic driver including first and second sub-drivers each having a stationary-side electrode and a movable-side electrode, the first and second sub-drivers being non-resonant actuators that pivotally move the scanning component about a pivot axis, first and second wirings extending from the movable-side electrodes of the first and second sub-drivers, respectively, the first and second wirings being electrically parallel to each other and connected to each other at a connection point;
a controller that controls emission of the light from the light source component; and
a current sensor that senses a sum of currents that flow through the first and second wirings, respectively, by sensing current that is generated by a capacity change of the driver and flows from the connection point of the first and second wirings, the current sensor including a first path and a second path that is electrically parallel to the first path, the controller further controlling the emission of the light from the light source component based on the sum of the currents sensed by the current sensor.

2. The optical scanning device according to claim 1, wherein
the controller reduces the emission of the light from the light source component.

3. The optical scanning device according to claim 1, wherein
the controller compares the sensed current with a predetermined reference current, and controls the emission of the light from the light source component according to comparison of the sensed current with the predetermined reference current.

4. The optical scanning device according to claim 3, wherein
the predetermined reference current indicates current for when the scanning component is being driven normally.

5. The optical scanning device according to claim 3, wherein
the controller controls the emission of the light from the light source component when a difference between the sensed current and the predetermined reference current exceeds a predetermined range.

6. The optical scanning device according to claim 5, wherein
the controller reduces the emission of the light from the light source component when a maximum value of the sensed current is below a first threshold, or when a minimum value of the sensed current is above a second threshold that is below the first threshold.

7. The optical scanning device according to claim 6, wherein
the controller reduces the emission of the light from the light source component when the maximum value of the sensed current is above a third threshold that is above the first threshold, or when the minimum value of the sensed current is below a fourth threshold that is below the second threshold.

8. The optical scanning device according to claim 3, wherein
the controller compares a phase of the sensed current with a phase of the predetermined reference current, and controls the emission of the light from the light source component according to comparison of the phase of the sensed current with the phase of the predetermined reference current.

9. The optical scanning device according to claim 8, wherein
the controller compares the phase of the sensed current with the phase of the predetermined reference current based on a difference between a timing when a value of the sensed current reaches a predetermined threshold and a timing when a value of the predetermined reference current reaches the predetermined threshold.

10. The optical scanning device according to claim 9, wherein
the controller reduces the emission of the light from the light source component when the difference is greater than a predetermined length of time.

11. The optical scanning device according to claim 1, wherein
the scanning component scans the light in a scanned region during a drawing period, and returns the light from a scanning end position to a scanning start position during a return period, and the controller controls the emission of the light from the light source component based on the sensed current acquired from the current sensor for either the return period or the drawing period.

12. The optical scanning device according to claim 1, wherein
the current sensor has an extraction component that extracts a resonance frequency of resonant vibration from the sensed current, and a first amplifier that amplifies an output from the extraction component on the first path.

13. The optical scanning device according to claim 1, wherein
the current sensor has a second amplifier that amplifies the sensed current on the second path.

14. The optical scanning device according to claim 13, further comprising
a temperature sensor that senses a temperature of the current sensor,
the second amplifier having a variable amplification ratio that is variably set based on the temperature sensed by the temperature sensor.

15. The optical scanning device according to claim 1, wherein
the controller compares values of the sensed current sensed at different timings, and controls the emission of the light from the light source component according to comparison of the values of the sensed current.

16. The optical scanning device according to claim 3, wherein
the controller compares values of the sensed current and the predetermined reference current at the same timing, and reduces the emission of the light from the light source component when a difference of the values is greater than a predetermined threshold.

17. The optical scanning device according to claim 3, wherein
the controller compares the sensed current with the predetermined reference current based on a difference between a length of time during which a value of the sensed current is beyond a predetermined threshold value and a length of time during which a value of the predetermined reference current is beyond the predetermined threshold.

18. The optical scanning device according to claim 17, wherein
the controller reduces the emission of the light from the light source component when the difference is greater than a predetermined length of time.

19. An optical scanning device comprising:
a light source component that emits light;
a scanning component that scans the light;
an electrostatic driver that drives the scanning component, the electrostatic driver including a stationary-side electrode and a movable-side electrode that is movable relative to the stationary-side electrode about an pivot axis, the stationary-side electrode and the movable-side electrode forming a non-resonant actuator that pivotally moves the scanning component about the pivot axis, the stationary-side electrode and the movable-side electrode overlapping with each other as viewed in a direction parallel to the pivot axis while the electrostatic driver is in a neutral position, first and second wirings extending from the movable-side electrodes of the first and second sub-drivers, respectively, the first and second wirings being electrically parallel to each other and connected to each other at a connection point;

a controller that controls emission of the light from the light source component; and a current sensor that senses a sum of currents that flow through the first and second wirings, respectively, by sensing current that is generated by a capacity change of the driver and flows from the connection point of the first and second wirings, the current sensor including a first path and a second path that is electrically parallel to the first path, the controller further controlling the emission of the light from the light source component based on the sum of the currents sensed by the current sensor.

* * * * *